(12) United States Patent
Goto et al.

(10) Patent No.: US 7,142,711 B2
(45) Date of Patent: Nov. 28, 2006

(54) IMAGE PROCESSING METHOD AND IMAGE APPARATUS, AND IMAGE FORMING APPARATUS, PROGRAM, AND STORAGE MEDIUM

(75) Inventors: Makio Goto, Nara (JP); Masanori Minami, Yamatokoriyama (JP); Tatsuya Tanaka, Yamatokoriyama (JP)

(73) Assignee: Sharp Kabushiki Kaisha (JP)

( * ) Notice: Subject to any disclaimer, the term of this patent is extended or adjusted under 35 U.S.C. 154(b) by 730 days.

(21) Appl. No.: 10/341,720

(22) Filed: Jan. 13, 2003

(65) Prior Publication Data
US 2003/0133607 A1    Jul. 17, 2003

(30) Foreign Application Priority Data
Jan. 16, 2002    (JP)    ............... 2002-007925

(51) Int. Cl.
*G06K 9/00*    (2006.01)

(52) U.S. Cl. .............. 382/167; 382/175; 382/190; 358/1.9; 348/223.1

(58) Field of Classification Search ............... 382/162, 382/164, 167, 173, 175, 176, 274, 180, 190; 358/1.9, 518, 520; 348/222.1, 223.1, 649
See application file for complete search history.

(56) References Cited

U.S. PATENT DOCUMENTS 5,018,008 A  *  5/1991  Asada ................. 358/518
5,900,860 A  *  5/1999  Ueda .................. 345/600
2003/0043394 A1 *  3/2003  Kuwata et al. ........... 358/1.9

FOREIGN PATENT DOCUMENTS

JP    2537997    7/1996

* cited by examiner

*Primary Examiner*—Jingge Wu
*Assistant Examiner*—Ali Bayat
(74) *Attorney, Agent, or Firm*—David G. Conlin; William J. Daley, Jr.; Edwards Angell Palmer & Dodge LLP

(57) ABSTRACT

In a color conversion section 10a, a mode judging section 31 judges a mode in effect: a copy mode or a printer mode, according to a mode judging signal. When the copy mode is identified, the mode judging section 31 supplied RGB data to a first color conversion process section 32, and the first color conversion section 32 carries out a first color conversion process in which a transitional color conversion value, which is color-transited from a precise color conversion value and a memory color conversion value, is set as a color conversion value with respect to memory color corresponding data. When the printer mode is identified, the mode judging section 31 supplies the RGB data to a second color conversion process section 33, and the second color conversion process section 33 carries out a second color conversion process in which the memory color conversion value is set as a color conversion value with respect to the memory color corresponding data.

25 Claims, 14 Drawing Sheets

⟶ EXAMPLE OF CONVENTIONAL REPRODUCTION
- - -> EXAMPLE OF REPRODUCTION OF PRESENT

IMAGE PROCESSING METHOD AND IMAGE APPARATUS, AND IMAGE FORMING APPARATUS, PROGRAM, AND STORAGE MEDIUM

FIELD OF THE INVENTION

The present invention relates to image processing carried out by a digital color image forming apparatus such as digital color copying machines and multifunctional machines, a color management system, etc.

BACKGROUND OF THE INVENTION

On the ground of recent rapid digitalization of office automation equipments and increasing demand for outputting color images, electrophotographic digital color copying machines and ink-jet/thermal-transfer color printers have been widely diffused as apparatuses for outputting images. For instance, color image data such as texts and landscapes inputted using an inputting apparatus and color image data created by means of a computer, which are based on a visible object taken by a scanner or a digital camera, are printed out using these outputting apparatuses. In these inputting and outputting apparatuses, it is necessary to stably output an image in which colors of inputted color image data are properly reproduced, and a color conversion (color correction) process related to digital image processing techniques plays an important role in realizing this.

Various methods of the color conversion process have conventionally been proposed, including a color coordinate transformation method for converting input image data into uniform color spatial data. As such methods, there are a look up table (hereinafter, will be simply referred to as LUT) method described in publications including the Color Science Association of Japan ed.; "New Color Science Handbook"; University of Tokyo Press; No. 1; pp. 137–149 and "Journal of the Imaging Society of Japan"; Vol. 37; No. 4 (1998); pp. 555–559, and a masking method. In the following descriptions, methods such as correcting a color signal which is inappropriate as an output, converting a color signal in order to change colors themselves, and transforming a color coordinate even if colors themselves are not changed are all termed color conversion.

A direct conversion method which is a sort of the LUT method is arranged in such a manner that after calculating color conversion data with respect to all combinations of input image data, the results thereof are stored in a color conversion table, and then referring to table values in accordance with the input image data, the results are outputted as output image data. This direct conversion method is carried out by accessing the color conversion table so that a required circuit arrangement is simple and the processing is done relatively speedily, and hence this method can be adopted irrespective of nonlinear characteristics.

A three-dimensional correcting method which is also a sort of the LUT method is arranged in such a manner that after calculating table values with respect to the combinations of selected parts of input image data and storing the results in a color conversion table, input image data in proximity to the input image data whose table values have been stored in the color conversion table is worked out by three-dimensional correcting using the table values stored in the color conversion table. With this three-dimensional correcting method, it is possible to work out color conversion values of all combinations of the sets of input image data, even if the number of the sets of input image data whose table values should be calculated in advance is limited. On this account, adopting the three-dimensional correcting method makes it possible to reduce the size of the color conversion table, compared to the direct conversion method.

Moreover, there is a known process termed a memory color conversion process in which an image to which memory colors such as flesh color, sky blue, and vegetable green can be allocated are subjected to a special treatment on the occasion of the color conversion process so that the image is reproduced with preferable colors for humans. When reproducing memory color corresponding data which is inputted as the data of an image to which memory colors are allocated, humans have a preference for color reproduction corresponding to colors similar to those experienced by them at an earlier time, rather than color reproduction precisely corresponding to colors of an image (texts and landscapes) to be reproduced. On this account, carrying out the memory color conversion process enables to output an image with preferable colors. Since a preferable color is different among individuals, an average value of colors preferred by test subjects is usually taken as the most preferable color to be reproduced, and used for apparatuses such as printers.

As an example of the memory color conversion process, there is a Japanese Patent No. 2537997 (registered on Jul. 8, 1996) which discloses color adjustment carried out in such a manner that after adjusting colors only around an area in which memory colors are reproduced and then hard-copying the whole image, the amount of movement in relation to the color adjustment at the barycenter of the area is arranged so as to be large in order to eliminate the discontinuity between colors, and the amount of movement is decreased as distances from the barycenter increase. With this arrangement, natural levels of tone can be kept, only an area having colors similar to memory colors can be freely adjusted by the users, and preferable memory colors can be reproduced.

However, in the conventional art, provided that an object such as a text and a landscape including a part to which memory colors can be allocated is read as an original image and then a color conversion process is carried out so that the original image is reproduced with either precise colors or memory colors and in a visible form such as a printed matter and a displayed image, an image reproduced with precise colors appears unnatural on the occasion of not comparing the image to the original image, while an image reproduced with memory colors appears unnatural on the occasion of comparing the image to the original image. For instance, an image reproduced with precise colors appears natural when compared to the original image, while the reproduced image appears unnatural when not being compared to the original image, because an area which should be reproduced with memory colors is recognized as an area with colors drifted from the memory colors. In contrast, an image reproduced with memory colors appears natural when not being compared to the original image, while this reproduced image appears unnatural as the drift of colors from those of the original image is perceived when compared to the original image.

SUMMARY OF THE INVENTION

The present invention is done for solving the foregoing problems, so that the objective of the present invention is to provide an image processing method, an image processing apparatus, an image forming apparatus, a program, and a storage medium, which can carry out a color conversion process in such a manner that a reproduced image (i) which is read from a visible object to which a memory color can be allocated, as an original image, and (ii) which is obtained through the color conversion process, appears natural with or without the comparison with the original image.

To achieve the foregoing objective, the image processing method in accordance with the present invention, comprising a step of carrying out a color conversion process in which first color image data composed of a first color system is converted to second color image data composed of a second color system, and when the first color image data is read image data which is obtained by reading a visible object as an original image, the second color image data is set so as to be reproduced image data for forming a reproduced image of the original image, is characterized in that, the color conversion process is carried out in such a manner that, when the read image data includes data which is judged as memory color corresponding data, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data, while the reproduced image data is obtained using the precise color conversion value, with respect to the read image data other than the memory color corresponding data.

According to this invention, when the first color image data is the read image data and data judged as the memory color corresponding data is included, instead of fixing the memory color corresponding data at either the precise color conversion value or the memory color conversion value, the memory color corresponding data is converted to the transitional color conversion value in the color transition area which is color-converted from the precise color conversion value and the memory color conversion value, so as to be the reproduced image data, i.e. the second color image data. Moreover, the read image data other than the memory color corresponding data is converted to the precise color conversion value so as to be the reproduction data, i.e. the second color image data. Since the color transition area is an area in which the precise color conversion value and the memory color conversion value are color-transited to predetermined points, in the color transition area, it is possible to obtain the transitional color conversion value whose reproduced image colors with respect to the memory color corresponding data appears both precise colors and memory colors. With this arrangement, the reproduced image looks natural with or without the comparison with the original image.

As a result, it is possible to carry out a color conversion process in such a manner that a reproduced image (i) which is read from a visible object to which a memory color can be allocated, as an original image, and (ii) which is obtained through the color conversion process, appears natural with or without the comparison with the original image.

For a fuller understanding of the nature and advantages of the invention, reference should be made to the ensuing detailed description taken in conjunction with the accompanying drawings.

DESCRIPTION OF THE EMBODIMENTS

An embodiment in accordance with the present invention will be described as follows, in reference to FIGS. 1–14.

Figure 13:
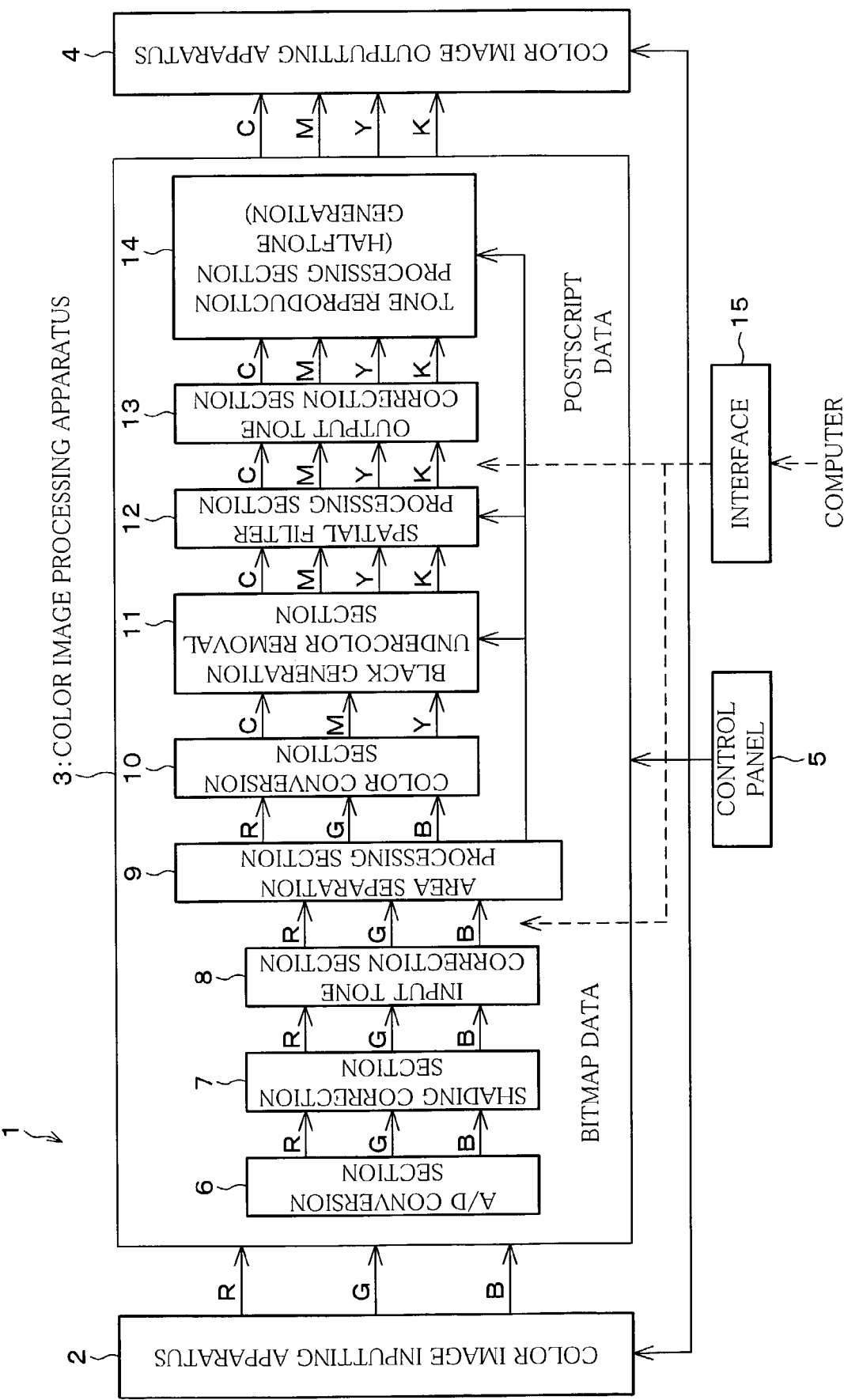
FIG. 13 is a block diagram, illustrating an arrangement of an image forming apparatus of the embodiment in accordance with the present invention.

FIG. 13 illustrates an arrangement of an image forming apparatus 1 in accordance with the present embodiment. The image forming apparatus 1 which is either a digital color copying machine or a multifunctional machine includes a color image inputting apparatus 2, a color image processing apparatus 3, a color image outputting apparatus 4, and a control panel 5.

The color image inputting apparatus 2 is image reading means for reading a visual object as an original image in a predetermined reading condition, and is composed of a scanning section including a CCD (Charge Coupled Device). The color image inputting apparatus 2 converts a reflected-light image, which is taken from a document as an original image, to RGB (red, green and blue) analog signals by the CCD, so as to output these signals to the color image processing apparatus 3.

The color image processing apparatus (image processing apparatus) 3 carries out predetermined image processing by converting the foregoing analog signals supplied from the color image inputting apparatus 2 to digital signals, so as to generate image outputting data which is CMYK digital color signals. Moreover, image data supplied from an external computer is also subjected to the image processing so that image outputting data which is CMYK digital color signals is generated. Then these sets of image outputting data are supplied to the color image outputting apparatus 4. Here, the processing by the color image processing apparatus 3 is controlled by a CPU (Central Processing Unit) which is not illustrated in the figure. The color image processing apparatus 3 will be specifically described later.

The color image outputting apparatus 4 is image outputting means for printing the image outputting data supplied from the color image processing apparatus 3 on a medium such as a piece of paper, and examples of this color image outputting apparatus 4 are such as an electrophotographic or ink-jet color image outputting apparatus. It is noted that the color image outputting apparatus 4 is not particularly limited to these examples.

The control panel 5 includes, for instance, input means such as a display screen composed of a liquid crystal display device (not illustrated), control buttons, and a ten-key pad. When the user gives an instruction such as the number of pieces of paper to be copied, the control panel 5 informs the user about a mode in effect, the result of a printing job, etc. Through this control panel 5, the user can give instructions regarding the color conversion process (will be discussed below) and check displayed information.

Next, the color image processing apparatus 3 will be described. The color image processing apparatus 3 includes: an A/D conversion section 6; a shading correction section 7; an input tone correction section 8; an area separation processing section 9; a color conversion section 10; a black generation undercolor removal section 11; a spatial filter processing section 12; an output tone correction section 13; and a tone reproduction processing section 14.

In the color image processing apparatus 3, analog signals supplied from the color image inputting apparatus 2 are supplied to the A/D conversion section 6, the shading correction section 7, the input tone correction section 8, the area separation processing section 9, the color conversion section 10, the black generation undercolor removal section 11, the spatial filter processing section 12, the output tone correction section 13, and the tone reproduction processing section 14 in this order, so as to be converted to image outputting data, and this image outputting data is temporally stored in storing means which is not illustrated. Then the image outputting data is read out at a predetermined timing and supplied to the color image outputting apparatus 4.

The A/D (Analog/Digital) conversion section 6 is provided for converting RGB analog signals to digital signals. The shading correction section 7 is provided for removing skews of the digital RGB signals supplied from the A/D conversion section 6, the skews being generated in a lighting system, a lens system, and an imaging system of the color image inputting apparatus 2. The input tone correction section 8 adjusts color balance of the RGB signals (signals indicating reflectance of RGB) from which the skews are removed in the shading section 7, and converts the RGB signals to signals such as density signals, which are easily handled in an image processing system used in the color image processing apparatus 3.

The area separation processing section 9 is provided for allocating pixels used for an inputted image to a text area, a screen area, and a photo area, according to the RGB signals. Based on the result of the allocation, the area separation processing section 9 outputs area identification signals, which indicate the correspondence of the pixels to the areas, to the black generation undercolor removal section 11, the spatial filter processing section 12, and the tone reproduction processing section 14, and also the area separation processing section 9 supplies input signals, which have been outputted from the input tone correction section 8, to the color conversion section 10 which is in the subsequent stage, without any modification of the signals.

The color conversion section (color conversion process means) 10 is provided for removing color haze according to spectral characteristics of CMY (Cyan, Magenta, and Yellow) color materials including unnecessarily absorbed matters. The color conversion section 10 converts first color image data, which is composed of the image data supplied from the area separation processing section 9, i.e. a first color system, to second color image data which is composed of a second color system. In the present embodiment, the first color system is an RGB color system, the first color image data is image data (RGB signals) composed of R data, G data, and B data, the second color system is a CMY color system, and the second color image data is image data (CMY signals) composed of C data, M data, and Y data. The first and second color systems may be arbitrary color systems, and the first color system may be identical with the second color system. Moreover, additional color system conversion may be carried out between the first and second color systems.

The black generation undercolor removal section 11 carries out (i) black generation in which a black (K) signal is generated from three-color CMY signals after the color conversion and (ii) the process of generating new CMY signals by subtracting the K signal, which is generated in the black generation, from the original CMY signals. With these processes, the three-color CMY signals are converted to four-color CMYK signals.

As an example of the process of black generation, there is a method (general method) of carrying out the black generation using skeleton black. According to this method, provided that the input/output characteristics of a skeleton curve is $y=f(x)$, the sets of data to be inputted are C, M, and Y, the sets of data to be outputted are C', M', Y', and K', and a UCR (Under Control Removal) ratio is $\alpha$ ($0<\alpha<1$), the black generation undercolor removal process is expressed by the following equations (1):

$$K'=f(\min(C, M, Y))$$

$$C'=C-\alpha K'$$

$$M'=M-\alpha K'$$

$$Y'=Y-\alpha K' \qquad (1)$$

The spatial filter processing section 12 subjects the image data of the CMYK signals, which are supplied from the black generation undercolor removal section 11, to a spatial filter process using a digital filter, which is in accordance with the area identification signals, so as to prevent the blur and the graininess of the inputted image by correcting spatial frequency characteristics. Being similar to the spatial filter processing section 12, the tone reproduction processing section 14 also subjects the image data of the CMYK signals to a predetermined process in accordance with the area identification signals.

For instance, in the area allocated to texts by the area separation processing section 9, high frequencies are enhanced through a sharpness enhancing process of the spatial filter process by the spatial filter processing section 12, in order to particularly reproduce black letters and colored letters more clearly. Simultaneously, in the tone reproduction processing section 14, either a binary process or a multi-valued process using a high-resolution screen which is suitable for reproducing high frequencies is selected.

Moreover, the area allocated to the screen by the area separation processing section 9 is subjected to a low-pass filter process in order to remove the inputted visible pattern with some frequencies, in the spatial filter processing section 12. Then after an output tone correction process, in which signals such as the density signals are converted to a screen area ratio which is a characteristic of the color image outputting apparatus 4, is carried out in the output tone correction section 13, a tone reproduction process (halftone generation), in which the image is eventually fragmented so as to be allocated to pixels in order to reproduce all levels of tone, is carried out in the tone reproduction processing section 14. The area allocated to photos by the area separation processing section 9 is subjected to the binary process or the multi-valued process using a screen by which reproduction of graduation is emphasized.

The foregoing image processing may be carried out automatically by the color image processing apparatus 3, or may be arbitrarily controlled via the control panel 5.

Moreover, when the image forming apparatus 1 is a multifunctional machine, an interface 15 is provided as in FIG. 13 and image data inputted from an external computer using the interface 15 can be subjected to image processing by the color image processing apparatus 3. When a printer mode for carrying out outputting in accordance with the processing above is selected, image data which passes through the interface 15 is supplied to, for instance, either the output tone correction section 13 when the image data is postscript data, or the area separation processing section 9 when the image data is bitmap data. Then the image data supplied to either of the foregoing members is subjected to the image processing above.

Here, the first color image data supplied from the color image inputting apparatus 2 to the color conversion section 10 is read image data which is obtained by reading a document as an original image, and the read image data is converted by the color conversion section 10 so as to be outputted as reproduced image data for forming an image as the reproduction of the document. Moreover, bitmap data supplied to the color conversion section 10 via the interface 15 is the first color image data, and this first color image data is converted by the color conversion section 10 so as to be outputted as the second color image data.

Further, when the multifunctional machine functions as a facsimile for digital transmission and outgoing data which is read out from a document by the color image inputting apparatus 2 is subjected to image processing by the color image processing apparatus 3 so as to be transmitted, or when the multifunctional machine functions as a facsimile for analog transmission and outgoing data is subjected to image processing by the color image processing apparatus 3 and then converted to analog signals so as to be outputted, the first color image data supplied from the color image inputting apparatus 2 to the color conversion section 10 is read image data obtained by reading the document as an original image, and this data is converted by the color conversion section 10 so as to be outputted as reproduced image data for forming the reproduction of the document. Moreover, when the multifunctional machine functions as a facsimile for both digital and analog transmissions and incoming data which is read out from a document by a transmitting end and then transmitted is subjected to image processing by the color image processing apparatus 3, the incoming data supplied to the color conversion section 19 is read image data. This arrangement can be applied to an image forming apparatus 1 which functions only as a facsimile.

Figure 14:
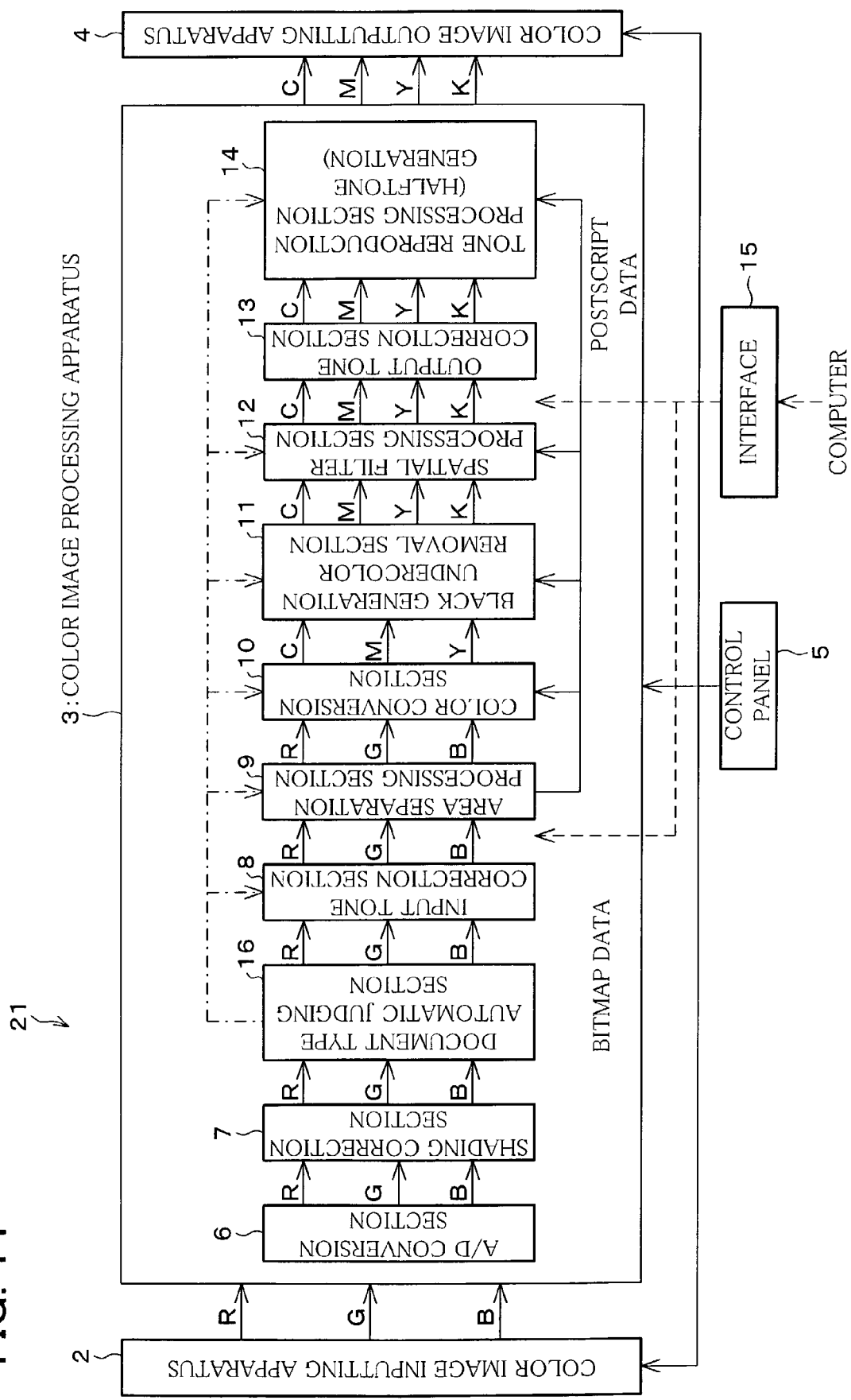
FIG. 14 is a block diagram, illustrating another arrangement of the image forming apparatus of the embodiment in accordance with the present invention.

In addition to the foregoing arrangement of the image forming apparatus 1, the image forming apparatus may include document type judging means. FIG. 14 illustrates an image forming apparatus 21 which is arranged in such a manner that a document type automatic judging section 16 is added to the image forming apparatus 1 of FIG. 13. The image forming apparatus 21 also functions as a digital color copying machine or a multifunctional machine. In the image forming apparatus 21, the document type automatic judging section 16 is provided between a shading correction section 7 and an input tone correction section 8.

The document type automatic judging section 16 judges which type a supplied image is, that is to say, a text document, a photo document (such as a printed photo and a continuous tone image photo), or a text/photo document in which these two are mixed, according to the RGB signals (signals indicating reflectance of RGB) from which skews are removed by the shading correction section 7. Then the result of the judgment is outputted, as a document type judging signal, to the input tone correction section 8, the area separation processing section 9, the color conversion section 10, the black generation undercolor removal section 11, the spatial filter processing section 12, and the tone reproduction processing section 14. On this occasion, the input tone correction section 8 adjusts the balance of colors as well as carries out image quality adjustment such as the removal of background colors and the adjustment of contrast, according to the document type judging signal which is the result of the judgment made by the document type automatic judging section 16. As a method of automatically judging the type of a document, it is possible to adopt a method disclosed by Japanese Patent Application No. 2001-12450 (Tokugan 2001-12450; applied on Jan. 19, 2001) which has already been applied by the applicant of the present invention. The document type automatic judging section 16 may be arranged in such a manner that the degree of recognizing text and photo documents is estimated and the result of the estimation is outputted as a document type judging signal.

In the document type automatic judging section 16, moreover, the foregoing RGB signals supplied from the shading correction section 7 are subjected to complementary reversal so as to be converted to CMY signals, i.e. to signals such as density signals which are easily handled in an image processing system adopted in a color image processing apparatus. Further, in the image forming apparatuses 1 and 21, it is possible to specify the type of a document by arbitrarily selecting the type of a document, using the control panel 5. Incidentally, when an image forming apparatus 21 as a multifunctional machine carries out image processing in a printer mode, the processing is identical with the processing carried out by the forging image forming apparatus 1.

Now, arrangements of the image forming apparatus 1 and the color conversion section 10 of the image forming apparatus 21 and a color conversion process carried out by the color conversion section 10 which is a part of the image processing of the present embodiment will be described, referring to various examples.

FIRST EXAMPLE

Figure 1:
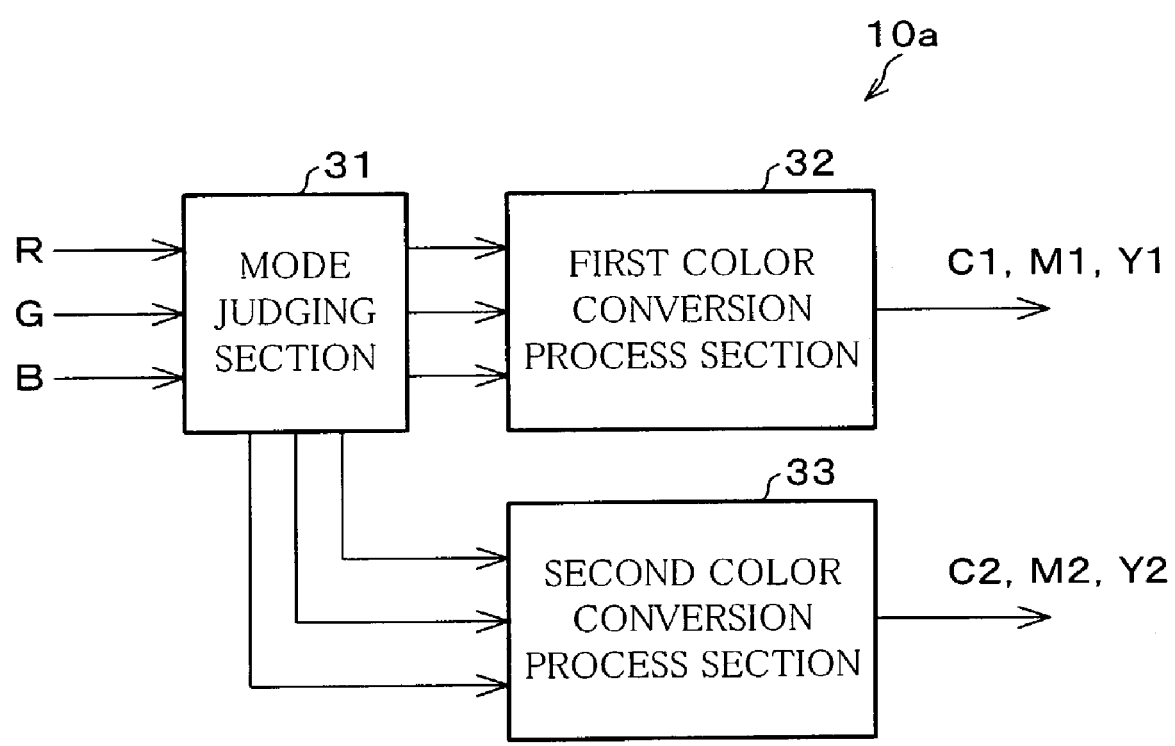
FIG. 1 is a block diagram, illustrating an arrangement of a color conversion section of First Example of an embodiment in accordance with the present invention.

FIG. 1 illustrates an arrangement of a color conversion section 10*a* which is First Example of the color conversion section 10. The color conversion section 10*a* includes a mode judging section 31, a first color conversion process section 32, and a second color conversion process section 33.

The mode judging section 31 judges whether RGB data (RGB signals) which is first color image data supplied to the color conversion section 10a is generated in a copy mode or in a printer mode, according to a supplied mode judging signal. This judgment is made by a CPU so that the mode judging signal is outputted from the CPU. When the RGB data is generated in the copy mode, the RGB data is read so as to be supplied to the first color conversion process section 32 as read image data. When the RGB data is generated in the printer mode, the RGB data is read so as to be supplied to the second color conversion process section 33, as first color image data which is not the read image data.

The first color conversion process section 32 carries out a first color conversion process for converting the supplied RGB data to CMY data which is second color image data expressed as sets of image data C1, M1, and Y1 and also reproduced image data. The first color conversion process is carried out using a first LUT which is an LUT having a color conversion value corresponding to predetermined RGD data, and the first color conversion process section 32 includes this first LUT therein. In the first LUT, a color conversion value for memory color corresponding data is set in accordance with the read image data (RGB data) which has already been determined to be judged as the memory color corresponding data in advance.

This color conversion value is a transitional color conversion value in a color transition area in which (i) a precise color conversion value for converting read image data to reproduced image data and (ii) a memory color conversion value for subjecting the read image data to memory color conversion process, are transited to predetermined points because of color transition in order to obtain a reproduced image whose color is substantially identical with an original image. This transitional color conversion value, which will be specifically described later, is an intermediate value of the precise color conversion value and the memory color conversion value, figured out from these two.

Moreover, the first LUT is provided with the precise color conversion value as a color conversion value, with respect to the read image data (RGB data) which is other than the read image data having been determined to be judged as memory color corresponding data.

The second color conversion process section 33 carries out a second color conversion process for converting inputted RGB data to CMY data as second color image data, expressed as sets of image data C2, M2, and Y2. The second color conversion process is carried out using a second LUT which is an LUT with a color conversion value corresponding to predetermined RGB data, and the second color conversion process section 33 includes this second LUT therein. The second LUT is provided with (i) a memory color conversion value as a color conversion value, corresponding to first color image data (RGB data) which has been determined to be judged as memory color corresponding data in advance and (ii) a precise color conversion value as a color conversion value, corresponding to first color image data (RGB data) which is other than the first color image data which has been determined to be judged as memory color corresponding data in advance.

As LUT methods using the first and second LUTs, there are such methods as a direct conversion method, a three-dimensional correcting method, a two-dimensional method which has already been applied by the applicant of the present invention disclosed in Japanese Patent Application 2000-169633 (Tokukai 2000-169633; applied on Jun. 6, 2000) i.e. Japanese Laid-Open Patent Application No. 2001-157072 (Tokukai 2001-157072; published on Jun. 8, 2002), and a bit cutoff direct conversion method in which table values are allocated to only higher bits of inputted RGB data and the table values of the higher bits are assigned regardless of the lower bits. It is noted that LUTs in examples below can adopt these methods as well.

Figure 2:
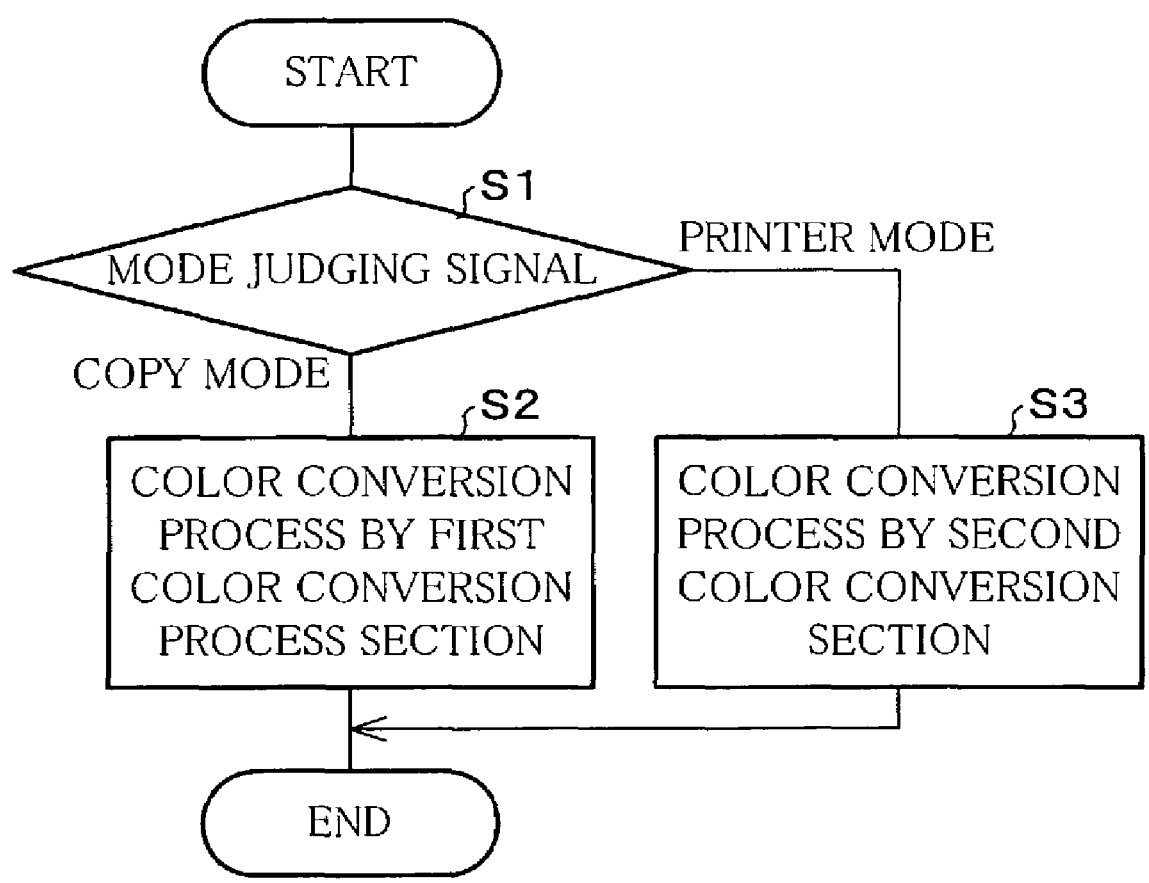
FIG. 2 is a flowchart, describing a color conversion process using the color conversion section of FIG. 1.

The color conversion processes in the color conversion section 10a with the foregoing arrangement will be described in reference to a flowchart in FIG. 2. In S1, the mode judging section 31 judges a mode in effect: a copy mode or a printer mode, according to a mode judging signal. When the copy mode is identified, the operation goes to S2 so that the mode judging section 31 supplies RGB data to the first color conversion process section 32, and the first color conversion process section 32 carries out a first color conversion process. On this occasion, a transitional color conversion value is automatically allocated to predetermined RGB data so that it is judged that memory corresponding data is inputted. When it is judged that the printer mode is in effect in S1, the operation goes to S3 so that the mode judging section 31 supplies the RGB data to the second color conversion process section 33, and the second color conversion process section 33 carries out a second color conversion process. On this occasion, a memory color conversion value is automatically allocated to predetermined RGB data, so that it is judged that the memory corresponding data is inputted.

Figure 3:
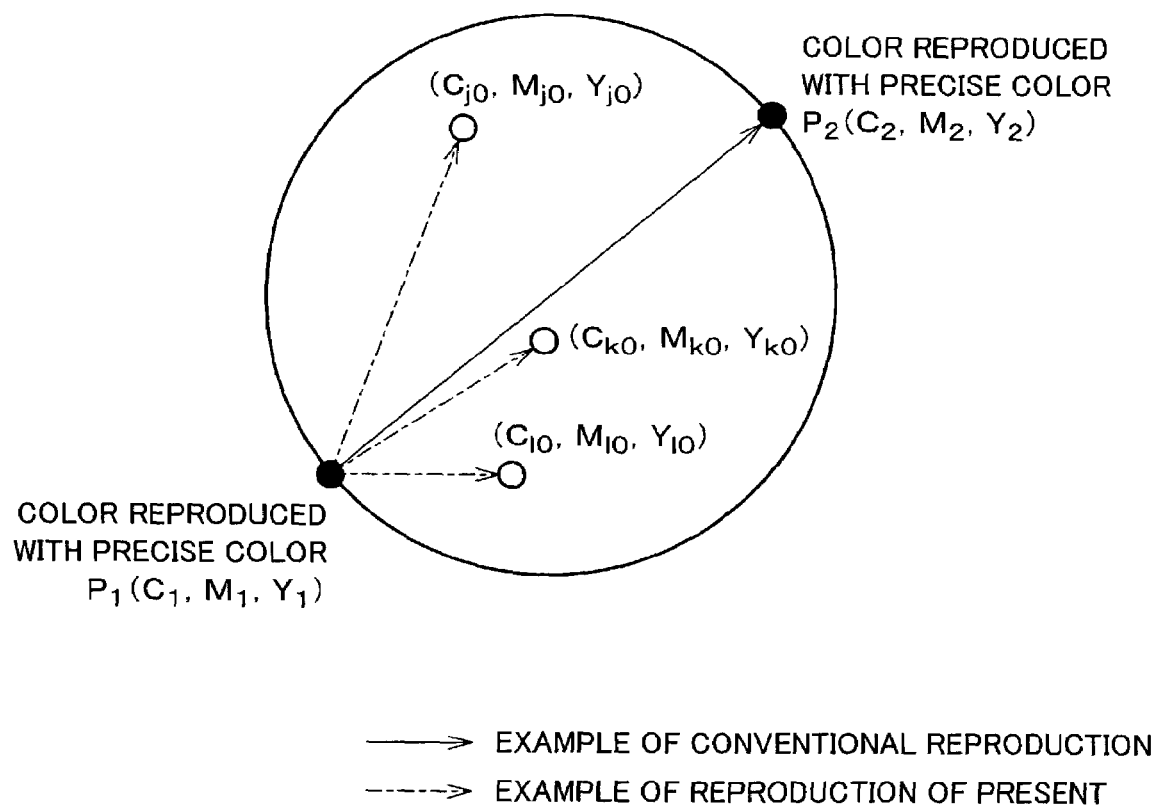
FIG. 3 is a CMY spatial drawing, illustrating a color transition area.

Next, the transitional color conversion value is specifically described. FIG. 3 illustrates a part of a CMY space including CMY data which can be allocated to RGB data to be supplied. Assume that, in reference to the figure, a precise color convention value corresponding to a set of the RGB data is a point $P_1$ $(C_1, M_1, Y_1)$ and a memory color conversion value corresponding to the set is a point $P_2$ $(C_2, M_2, Y_2)$. Conventionally, RGB data is converted to only either the point $P_1$ or the point $P_2$ which is the point $P_1$ being transferred in the direction indicated by a full-line arrow in the figure. In contrast, the present embodiment enables to allocate points in a color transition area, in which area color transition occurs from the point $P_1$ and $P_2$ to predetermined points, i.e. all successive lattice points in predetermined directions are subjected to color transition so as to be transited from the points $P_1$ and $P_2$ to predetermined lattice points, to memory color corresponding data as a transitional color conventional value.

The figure illustrates a case when the color transition area is circumscribed by a sphere whose diameter is a line from the point $P_1$ to the point $P_2$, and points $(C_{j0}, M_{j0}, Y_{j0})$, $(C_{k0}, M_{k0}, Y_{k0})$, and $(C_{10}, M_{10}, Y_{10})$ are exemplified as points transited from the point $P_1$ in direction indicated by dashed arrows. The center of the sphere is located at:

$$(C_0, M_0, Y_0) = ((C_1 + C_2)/2, (M_1 + M_2)/2, (M_1 + M_2)/2)$$

and a radius R is represented as:

$$R^2 = \{(C_1 - C_2)^2 + (M_1 M_2)^2 + (Y_1 - Y_2)^2\}/4$$

so that the color transition area can be represented as:

$$(c - C_0)^2 + (m - M_0)^2 + (y - Y_0)^2 \leq R^2$$

Provided that the sets of the CMY data are each represented by 8 bits, concrete examples of the points $P_1$ and $P_2$ are such as $P_1(45, 120, 135)$-$P_2(35, 110, 130)$ and $P_1(40, 95, 100)$-$P_2(30, 85, 100)$. The color transition area may be circumscribed by an elliptic sphere or combined circular cones, or may be just a range between the points $P_1$ and $P_2$.

Which point in the color transition area is selected as a transitional color conversion value is determined in accordance with the type of an image from which the memory color corresponding data is generated. The color transition area is an area in which a precise color conversion value and a memory color conversion value are subjected to color transition so as to be transited to predetermined points. With this arrangement, it is possible to set a transitional color conversion value in the color transition area so as to be a color conversion value with which colors reproduced in accordance with the memory color corresponding data appear both precise colors and memory colors. Thus, both in the case of comparing the reproduced image with the original image and in the case of not comparing these two, the reproduced image appears natural.

As a result, it is possible to carry out a color conversion process in which a reproduced image, which is read out from a document to which a memory color can be allocated and is obtained through a color conversion process, appears natural with or without the comparison with the original image.

Next, what is described below is an example of generating an LUT having a transitional color conversion value as a color conversion process, such as a first LUT. It is noted that this method can be adopted to examples which will be described below.

As an example of a method of generating an LUT, there is a method using a multi-regression analysis (least squares method in this example). In this example, the conversion of RGB data to CMY data is realized using a matrix which is shown as an equation (2).

[Equation. 2] (2)

$$\begin{pmatrix} C \\ M \\ Y \end{pmatrix} = \begin{pmatrix} a11 & a12 & a13 \\ a21 & a22 & a23 \\ a31 & a32 & a33 \end{pmatrix} \begin{pmatrix} R \\ G \\ B \end{pmatrix} + \begin{pmatrix} b1 \\ b2 \\ b3 \end{pmatrix}$$

The combinations of the values of typical CMY data are supplied to an image outputting apparatus equivalent to the color image outputting apparatus 4 so that color patches are outputted, and by reading the color patches using an image inputting apparatus equivalent to the color image inputting apparatus 2, the values of the corresponding CMY data and the values of the corresponding RGB data are obtained. Constants from $a_{11}$ to $a_{33}$ and constants from $b_1$ to $b_3$, which meet the foregoing relationship, are calculated using the least square method. To reproduce colors more precisely, the constants (matrix coefficients) are calculated with a term of the RGB data not lower than second order.

In the present method, the processing is carried out as below. With respect to a color (e.g. flesh color) to be reproduced by a transition, a scanning value $(R_i, G_i, B_i)$, which corresponds to a set of output data $(C_{i1}, M_{i1}, Y_{i1})$ of a color patch (a point $P_1(C_1, M_1, Y_1)$ indicating a precise color conversion value in FIG. 3), is obtained. A transitional color conversion value is set as $(C_{io}, M_{io}, Y_{io})$, where i is within the range of 0-n and indicates the number of points included in a sphere illustrated in FIG. 1. When output data of $(C_{k1}, M_{k1}, Y_{k1})(i=k(0 \leq k \leq n))$ is converted to the transitional color conversion value, the sets of data eventually become as below:

$(R_0, G_0, B_0) \leftarrow\!\!\rightarrow (C_{01}, M_{01}, Y_{01})$ $(R_1, G_1, B_1) \leftarrow\!\!\rightarrow (C_{11}, M_{11}, Y_{11})$

. . .

$(R_k, G_k, B_k) \leftarrow\!\!\rightarrow (C_{k0}, M_{k0}, Y_{k0})$

. . .

$(R_n, G_n, B_n) \leftarrow\!\!\rightarrow (C_{n1}, M_{n1}, Y_{n1})$

Here, with respect to $(R_k, G_k, B_k)$, $(C_{k1}, M_{k1}, Y_{k1})$ is provided instead of $(C_{k0}, M_{k0}, Y_{k0})$. Consequently, it is possible to realize color reproduction with a transitional color, by calculating matrix coefficients in regard to all sets of data $(R, G, B) \leftarrow\!\!\rightarrow (C, M, Y)$ using the least square method. When there are a plurality of transitional colors, corresponding output signals are adjusted.

When generating an LUT using a neural network, learning is carried out by setting (R, G, B) as input data and (C, M, Y) as target data.

Moreover, in the present embodiment, when an image formed in the printer mode is not compared to an original image on an electronic display apparatus, etc., first color image data in the printer mode is non-comparing image data for forming an image not compared to an original image. Since an image reproduced from memory color corresponding data of this non-comparing image data appears natural when reproduced with memory colors, a memory color conversion value is obtained as second color image data. Thus, the first color image data in the printer mode, which corresponds to the case when, as the second color image data, the memory color conversion value has been determined to be obtained from the memory corresponding data in advance, is memory color reproduction designating data.

When data is recognized as memory color corresponding data, a memory color conversion value is obtained as the second color image data, with respect to the data judged as memory color corresponding data, and a precise color conversion value is obtained as the second color image data, with respect to the memory color reproduction designating data other than the memory color corresponding data. In the foregoing example, when the printer mode is identified, it is possible to know that the data is memory color reproduction designating data. Thus, it is possible to convert memory color corresponding data to an image with memory colors which are preferable, when the data is identified as memory color reproduction designating data because of arrangements such as: image forming by a printer mode as in the present embodiment; image forming arranged such that, with respect to first color image data in a facsimile transmission mode in which a transmitting end carries out a color conversion process and the document is not copied or in a facsimile reception mode in which a receiving end carries out a color conversion process, an image which has been formed is not compared to an original image; and image forming in which it is not possible to compare an image which has been formed to an original image.

Moreover, according to the present embodiment, memory color corresponding data is converted to a transitional color conversion value using the LUT method so that a color conversion process can be easily carried out.

Further, provided that either: (i) the color conversion section 10 is provided with only the first color conversion process section 32, no printer mode is prepared, and read image data includes memory color corresponding data; or (ii) a printer mode is prepared but first color image data includes memory color corresponding data, a color conversion process may be carried out using a transitional color conversion value, regardless of these arrangements.

SECOND EXAMPLE

Figure 4:
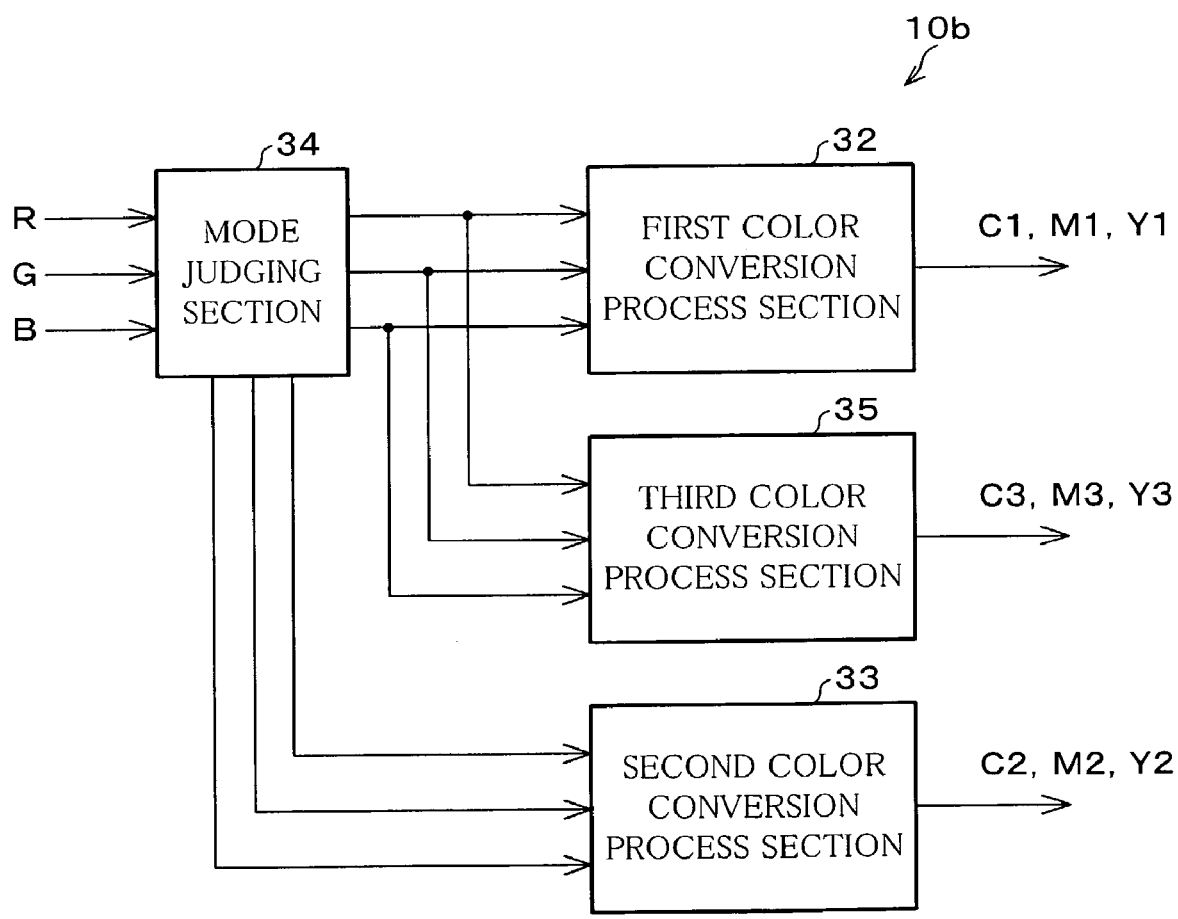
FIG. 4 is a block diagram, illustrating an arrangement of a color conversion section of Second Example of the embodiment in accordance with the present invention.

FIG. 4 illustrates an arrangement of a color conversion section 10b which is Second Example of the color conversion section 10. The color conversion section 10b includes a mode judging section 34, a first color conversion process section 32, a second color conversion process section 33, and a third color conversion process section 35.

The mode judging section 34 judges whether RGB data (RGB signals) which is first color image data supplied to the color conversion section 10b is generated in a copy mode or in a printer mode, according to a supplied mode judging signal. Moreover, when the RGB data (RGB signals) is generated in the copy mode, the mode judging section 34 judges whether the type of the document is a photo document or a text/photo document (texts and photos are mixed), more specifically a photo-including document which includes a photo or a text/line document (composed of at least either one of texts and lines). The type of the document is judged according to a control panel 5 of an image forming apparatus 1 or 21 or according to a document type judging signal supplied from a document type automatic judging section 16.

When the RGB data is generated in the copy mode and the document is the photo-including document, the mode judging section 34 reads the RGB data so as to supply the same to a first color conversion process section 32, as image data. When the RGB data is generated in the copy mode and the document is a text/line document, the mode judging section 34 reads the RGB data so as to supply the same to a third color conversion process section 35, as image data. When the RGB data is generated in the printer mode, the mode judging section 34 reads the RGB data so as to send the same to a second color conversion process section 33 as first color image data which is not read image data.

The first color conversion process section 32 and the second color conversion process section 33 are identical with those in First Example.

The third color conversion process section 35 carries out a third color conversion process for converting supplied RGB data to CMY data as second color image data represented by sets of image data C3, M3 and Y3 and as reproduced image data. For the third color conversion process, a third LUT which has a color conversion value corresponding to predetermined RGB data is used, and this third LUT is included in the third color conversion process section 35. In the third LUT, precise color conversion values with respect to all sets of first color image data (RGB data) are provided as color conversion values.

Figure 5:
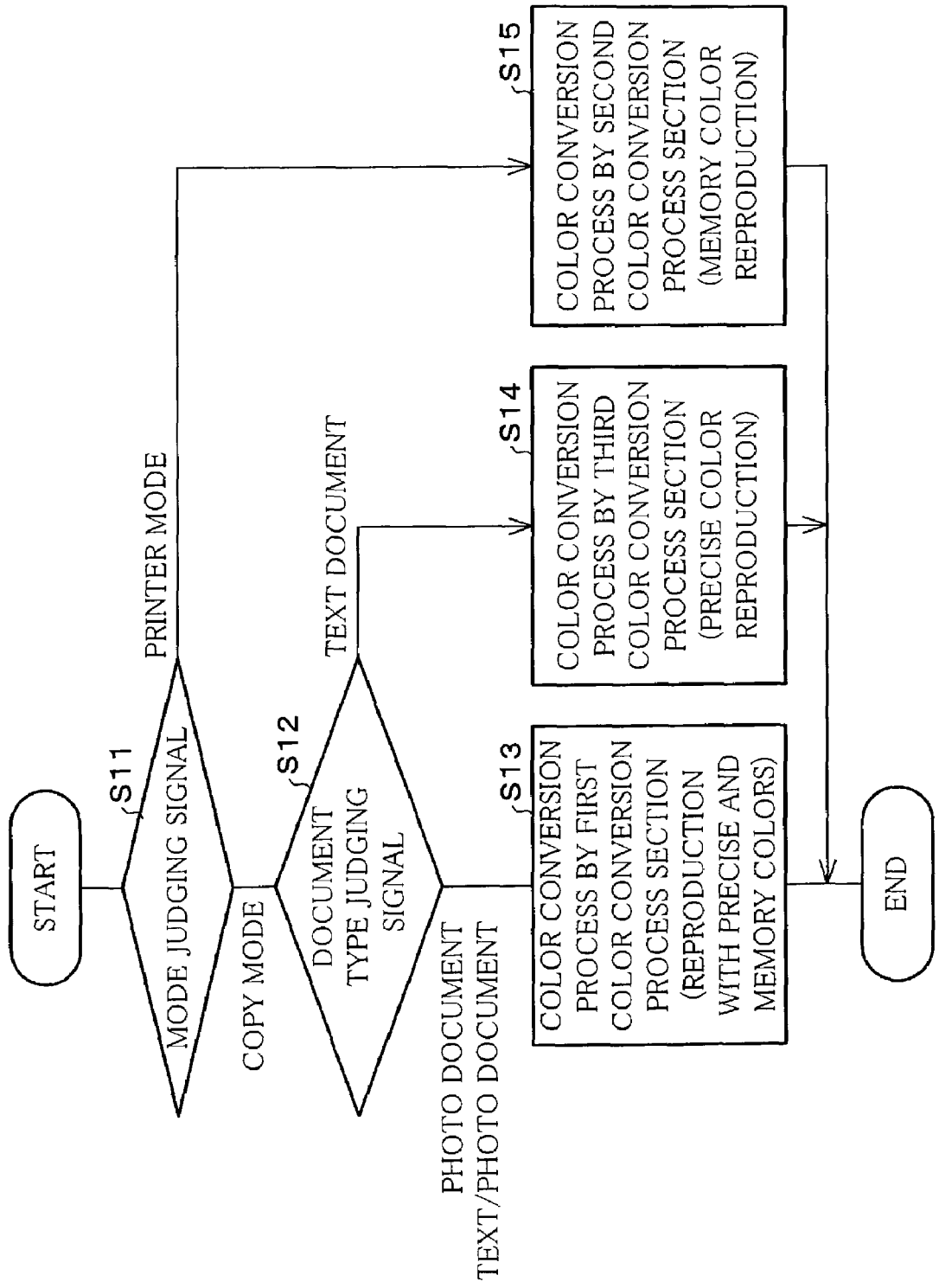
FIG. 5 is a flowchart, describing a color conversion process using the color conversion section of FIG. 4.

In reference to a flowchart in FIG. 5, the color conversion processes of the color conversion section 10b with the aforementioned arrangement are described below. In S1, the mode judging section 34 judges a mode in effect: the copy mode or the printer mode, according to a mode judging signal. When the copy mode is identified, the operation goes to S12 and the mode judging section 34 judges whether the type of the document is the photo-including document or the text/line document, according to a document type judging signal. When the photo-including document is identified, the operation goes to S13 so that the RGB data is supplied to the first color conversion process section 32, and the first color conversion process section 32 carries out a first color conversion process. When the text/line document (the figure only shows a text document) is identified in S12, the operation goes to S14 so that the RGB data is supplied to the third color conversion process section 35, and the third color conversion process section 35 carries out a third color conversion process. When the printer mode is identified in S11, the operation goes to S15 so that the mode judging section 34 supplies the RGB data to the second color conversion process section 33, and the second color conversion process section 33 carries out a second color conversion process.

According to the present embodiment, in the case of read image data which is read from the text/line document, a color conversion value is determined to be fixed at a precise color conversion value in advance so that the read image data is conversion value fix data, and it is possible to identify which data is the conversion value fix data. When the conversion value fix data is identified, with respect to all sets of the conversion value fix data, the color conversion value fixed at the precise color conversion value is obtained as the second color image data, so that it is possible to compellingly carry out only reproduction with precise colors.

Moreover, according to the present embodiment, when an original image is the photo-including document, data identified as memory color corresponding data is converted to a transitional color conversion value in order to obtain reproduced image data, and when an original image is the text/line document, data identified as memory color corresponding data is converted to a precise color conversion value in order to obtain reproduced image data. In other words, it is possible to carry out a color conversion process which is substantially suitable for the fact that the memory color corresponding data of the photo-including document is desirably reproduced with memory colors and the memory color corresponding data of the text/line document is desirably reproduced with precise colors.

THIRD EXAMPLE

Figure 6:
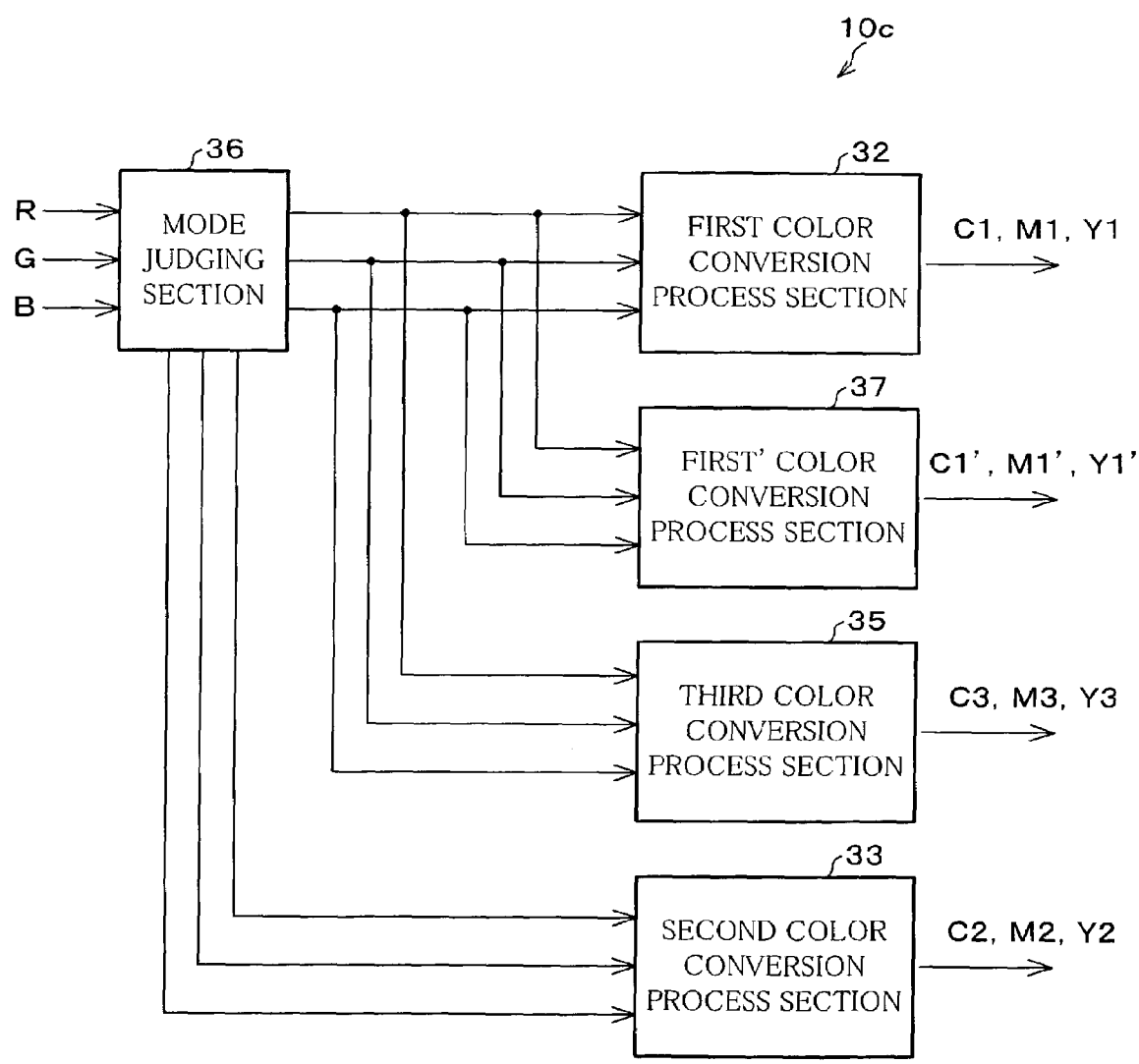
FIG. 6 is a block diagram, illustrating an arrangement of a color conversion section of Third Example of the embodiment in accordance with the present invention.

FIG. 6 illustrates an arrangement of a color conversion section 10c which is Third Example of the color conversion section 10. The color conversion section 10c includes a mode judging section 36, a first color conversion process section 32, a second color conversion process section 33, a third color conversion process section 35, and first' color conversion process section 37.

The mode judging section 36 judges whether RGB data (RGB signals) which is first color image data supplied to the color conversion section 10c is generated in a copy mode or in a printer mode, according to a supplied mode judging signal. Moreover, on occasions when the RGB data (RGB signals) is generated in the copy mode, the user gives an instruction using a control panel 5 so that the mode judging section 36 judges the type of a document: a continuous tone image document (photo-including document), a print photo document (photo-including document), or a text/line document, according to an image mode signal outputted from the control panel 5. The types of the document may include a text/photo document, etc.

When the RGB data is generated in the copy mode and the type of the document is the continuous tone image document, the mode judging section 36 supplies the RGB data to the first color conversion process section 32, as read image data. When the RGB data is generated in the copy mode and the type of the document is the print photo document, the RGB data is read so as to be supplied to the first' color conversion process section 37, as read image data. When the RGB data is generated in the copy mode and the type of the document is the text/line document, the RGB data is read so as to be supplied to the third color conversion process section 35, as read image data. When the RGB data is generated in the printer mode, the RGB data is read so as to be supplied to the second color conversion process section 33, as first color image data which is not the read image data.

The first color conversion process section 32, the second color conversion process section 33, and the third color conversion process section 35 are identical with those in Second Example, except that the color conversion value of a first LUT of the first color conversion process section 32 is included for the continuous tone image document.

The first' color conversion process section 37 carries out a first' color conversion process in which supplied RGB data is converted to CMY data which is second color image data expressed as sets of image data C1', M1', Y1' and also is reproduced image data. To the first' color conversion process, a first' LUT which is provided with a color conversion value corresponding to predetermined RGB data is adopted, and this first' LUT is included in the first' color conversion process section 37. The first' LUT is identical with the first LUT except that the color conversion value is arranged so as to correspond to the print photo document.

Figure 7:
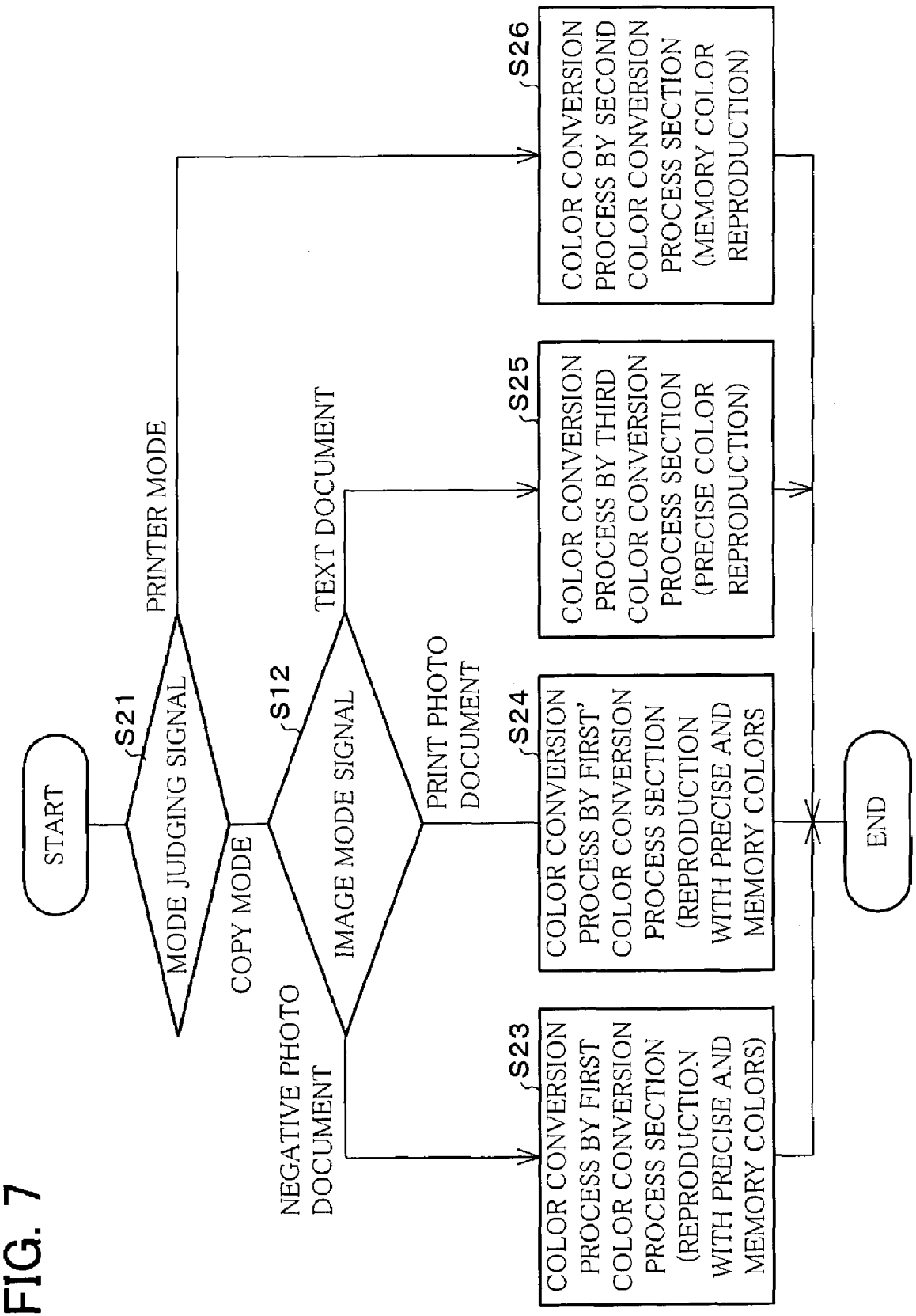
FIG. 7 is a flowchart, describing a color conversion process using the color conversion section of FIG. 6.

Referring to a flowchart in FIG. 7, color conversion processes of the color conversion section 10c with the aforementioned arrangement are described below. In S21, the mode judging section 36 judges the mode in effect: the copy mode or the printer mode, according to a mode judging signal. When the copy mode is identified, the operation goes to S22 and the mode judging section 36 judges whether the type of the document is a continuous tone image document or a print photo document. When the continuous tone image document is identified, the operation goes to S23 so that RGB data is supplied to the first color conversion process section 32, and the first color conversion process section 32 carries out a first color conversion process. When the print photo document is identified in S22, the operation goes to S24 so that the RGB data is supplied to the first' color conversion process section 37, and the first' color conversion process section 37 carries out a first' color conversion process. When the text/line document (the figure illustrates only a text document) is identified in S22, the operation goes to S25 so that the RGB data is supplied to the third color conversion process section 35, and the third color conversion process section 35 carries out a third color conversion process. When the printer mode is identified in S21, the operation goes to S26 so that the mode judging section 36 supplies the RGB data to the second color conversion process section 33, and the second color conversion process section 33 carries out a second color conversion process.

FOURTH EXAMPLE

In this example, when a mode judging section 34 of a color conversion section 10b in FIG. 4 identifies that the mode in effect is a copy mode according to a mode signal, it is determined that to which area read image data corresponds, namely a screen area, a photo area, or a text area, according to an area identification signal supplied from an area separation processing section 9. When it is identified that the read image data corresponds to either the screen area or the photo area, the read image data is supplied to a first color conversion process section 32. When it is identified that the read image data corresponds to the text area, the read image data is supplied to a third color conversion process section 35.

Figure 8:
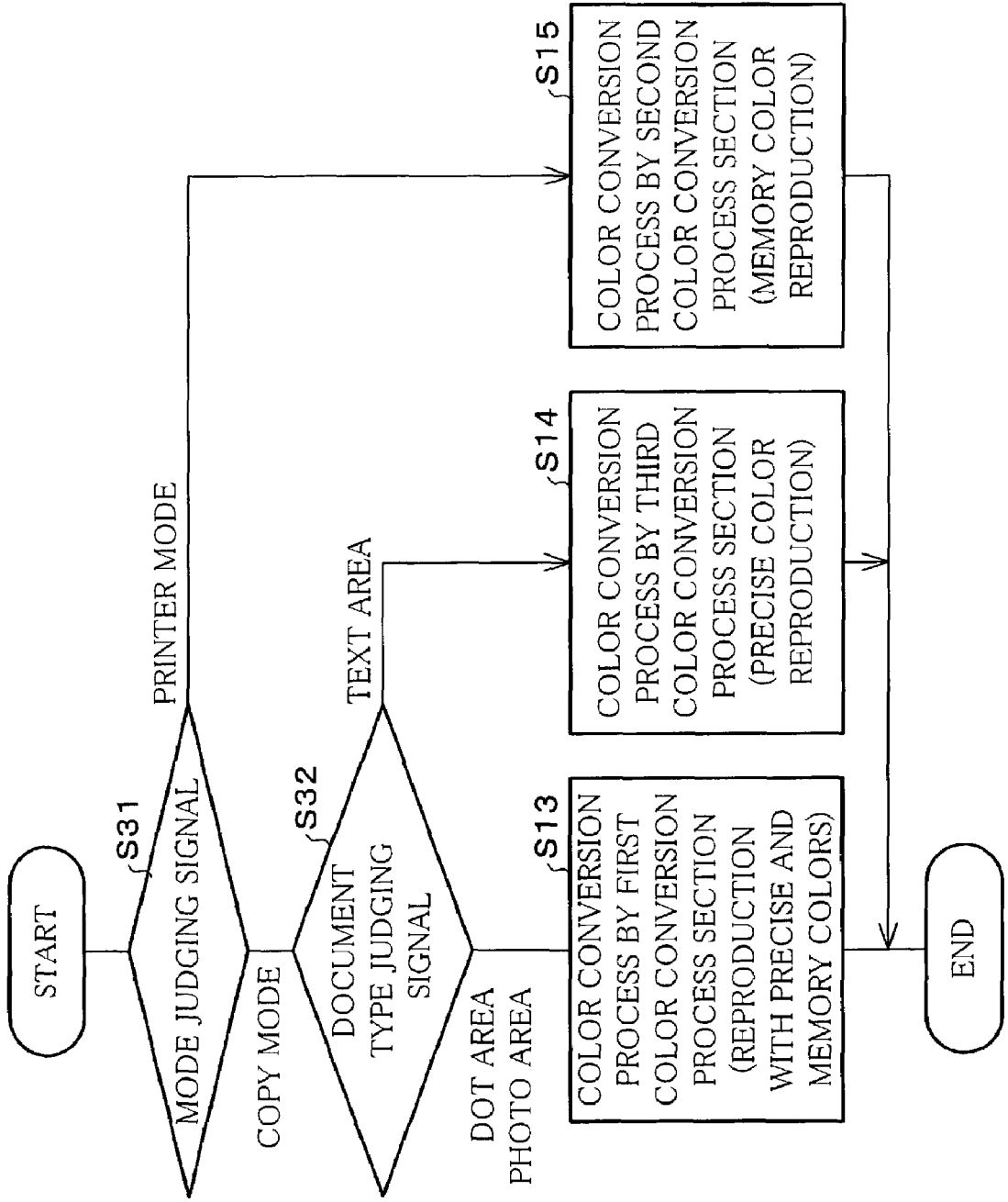
FIG. 8 is a flowchart, describing a color conversion process using a color conversion section of Fourth Example of the embodiment in accordance with the present invention.

The aforementioned color conversion process is described in reference to a flowchart in FIG. 8. In S31, the mode judging section 34 judges the mode in effect: a copy mode or a printer mode, according to a mode judging signal. When the copy mode is identified, the operation goes to S32 so that the mode judging section 34 judges the type of the area: a screen area, a photo area, or a text area, according to an area identification signal. When either the screen area or the photo area is identified, the operation goes to S33 so that RGB data is supplied to the first color conversion process section 32, and the first color conversion process section 32 carries out a first color conversion process. When the text area is identified in S32, the operation goes to S34 so that the RGB data is supplied to a third color conversion process section 35, and the third color conversion process section 35 carries out a third color conversion process. When the printer mode is identified in S31, the operation goes to S35 so that the mode judging section 34 supplies the RGB data to a second color conversion process section 33, and the second color conversion section 33 carries out a second color conversion process.

Now, an example of an area separation method is described as below.

As a method of separating input image data into a text/screen area (printed photo) and a photo (continuous tone image) area, for instance, it is possible to adopt a method described in "Proceeding for the Seminar of the Institute of Image Electronics Engineers of Japan 90-06-04". More specifically, the following judgments are carried out in a block of M×N (both natural numbers) pixels around a target pixel, so that an area identification signal of the target pixel is figured out.

1. An average value (Dave) of signal levels in 9 pixels at the center of the block is calculated, and using this average value, pixels in the block are binarized. Simultaneously, a maximum pixel signal level (Dmax) and a minimum pixel signal level (Dmin) are also calculated.

2. A screen area is identified on account of a large amount of fluctuation of an image signal in a small area and a high density compared to the background. That is to say, with respect to binarized data, the number Kh of changes from 0 to 1 and the number Kv of changes from 1 to 0 are counted in the direction of main scanning and in the direction of secondary scanning, and these numbers are compared to thresholds Th and Tv, and a screen area is identified when both Kh and Kv are more than the thresholds Th and Tv. Moreover, in order to prevent the mis-judgment as the background, Dmax, Dmin, and Dave are compared to thresholds B1 and B2. When Dmax-Dave>B1, Dave-Dmin>B2, Kh>Th, and Kv>Tv, a screen area is identified, and on the occasions other than this, a photo area is identified.

3. In a text area, since it is considered that the difference between the maximum signal level and the minimum signal level is large and the density is high, the identification of the text area is carried out as below. Maximum and minimum signal levels with respect to non-screen areas, which have been figured out in advance, are compared to thresholds Pa, Pb and Pc, and when at least either one of the signal levels are higher than any one of the thresholds, a text area is identified, and on occasions other than this, a photo area is identified. When Dmax>Pa, Dmin<Pb, or Dsub>Pc, a text area is identified, and on occasions other than this, a photo area is identified.

FIFTH EXAMPLE

Figure 9:
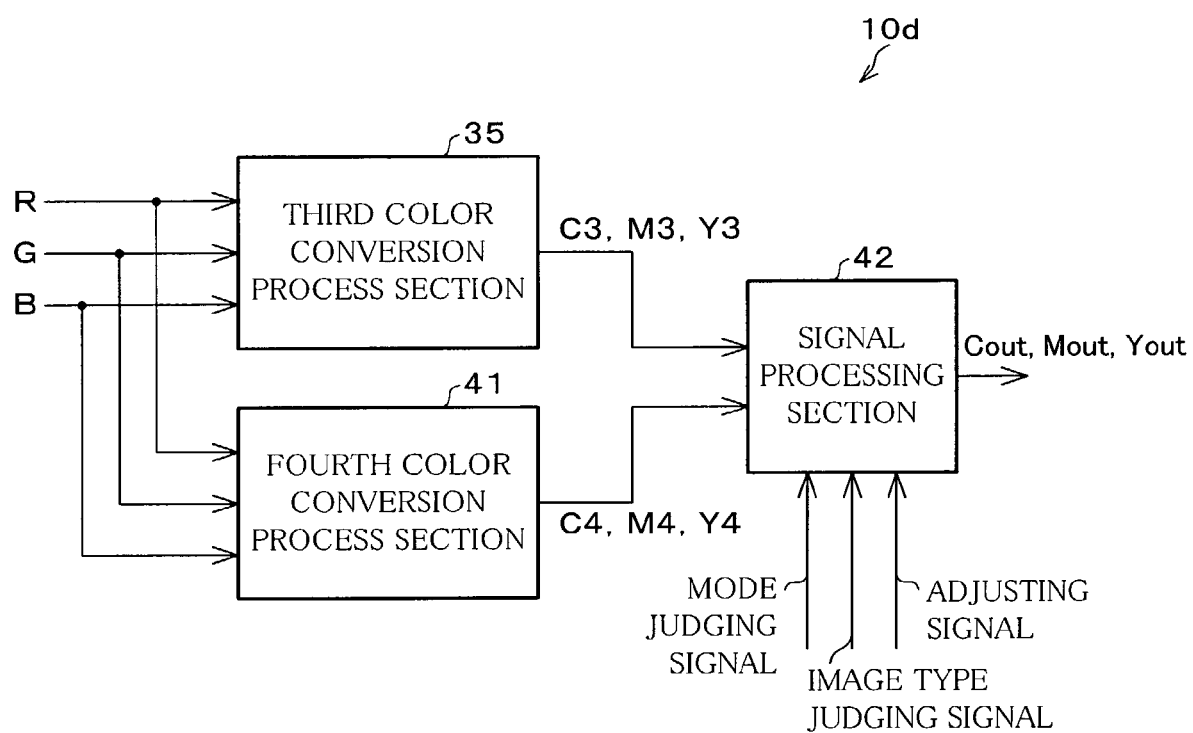
FIG. 9 is a block diagram, illustrating an arrangement of a color conversion section of Fifth Example of the embodiment in accordance with the present invention.

FIG. 9 illustrates an arrangement of a color conversion section 10d which is Fifth Example of the color conversion section 10. The color conversion section 10d includes a third color conversion process section 35, a fourth color conversion process section 41, and a signal processing section 42.

It is noted that the third color conversion process section 35 is identical with that of Second Example.

The fourth color conversion process section 41 carries out a fourth color conversion process in which supplied RGB data is converted to CMY data as second color image data represented by sets of image data C4, M4, and Y4. For the fourth color conversion process, a fourth LUT which includes a color conversion value corresponding to predetermined RGB data is used, and this fourth LUT is included in the fourth color conversion process section 41. As a color conversion value, the fourth LUT is provided with a memory color conversion value with respect to first color image data (RGB data) which is determined to be judged as memory color corresponding data in advance, and the fourth LUT is also provided with a precise color conversion value as a color conversion value, with respect to first color image data (RGB data) which is not the first color image data determined to be judged as memory color corresponding data in advance. Incidentally, as a color conversion value, the fourth LUT may include only the memory color conversion value with respect to the first color image data determined to be judged as memory color corresponding data in advance.

To the signal processing section 42, the sets of image data C3, M3, and Y3 supplied from the third color conversion process section 35 and the sets of the image data C4, M4, and Y4 supplied from the fourth color conversion process section 41 are inputted. The signal processing section 42 adds the sets of the image data C3, M3, and Y3 to the sets of the image data C4, M4, and Y4 at a ratio α which has been determined in accordance with a supplied mode judging signal, image type judging signals, and an adjusting signal (described later) in advance, so that sets of image data Cout, Mout, and Yout as second color image data are outputted. The image type judging signals are such as a document type judging signal, an image mode signal, and an area identification signal. When the fourth LUT is provided only with a memory color conversion value, the ratio of the sets of the image data C3, M3, and Y3 is set so as to be 1, with respect to the image data RGB other than the memory color corresponding data.

Table. 1 shows examples of the ratio α in a copy mode and in a printer mode. Here, α indicates the ratio of a memory color conversion value.

TABLE 1

| RATIO α | |
|---|---|
| COPY MODE | PRINTER MODE |
| 0.5–0.9 | 1.0 |

Figure 10:
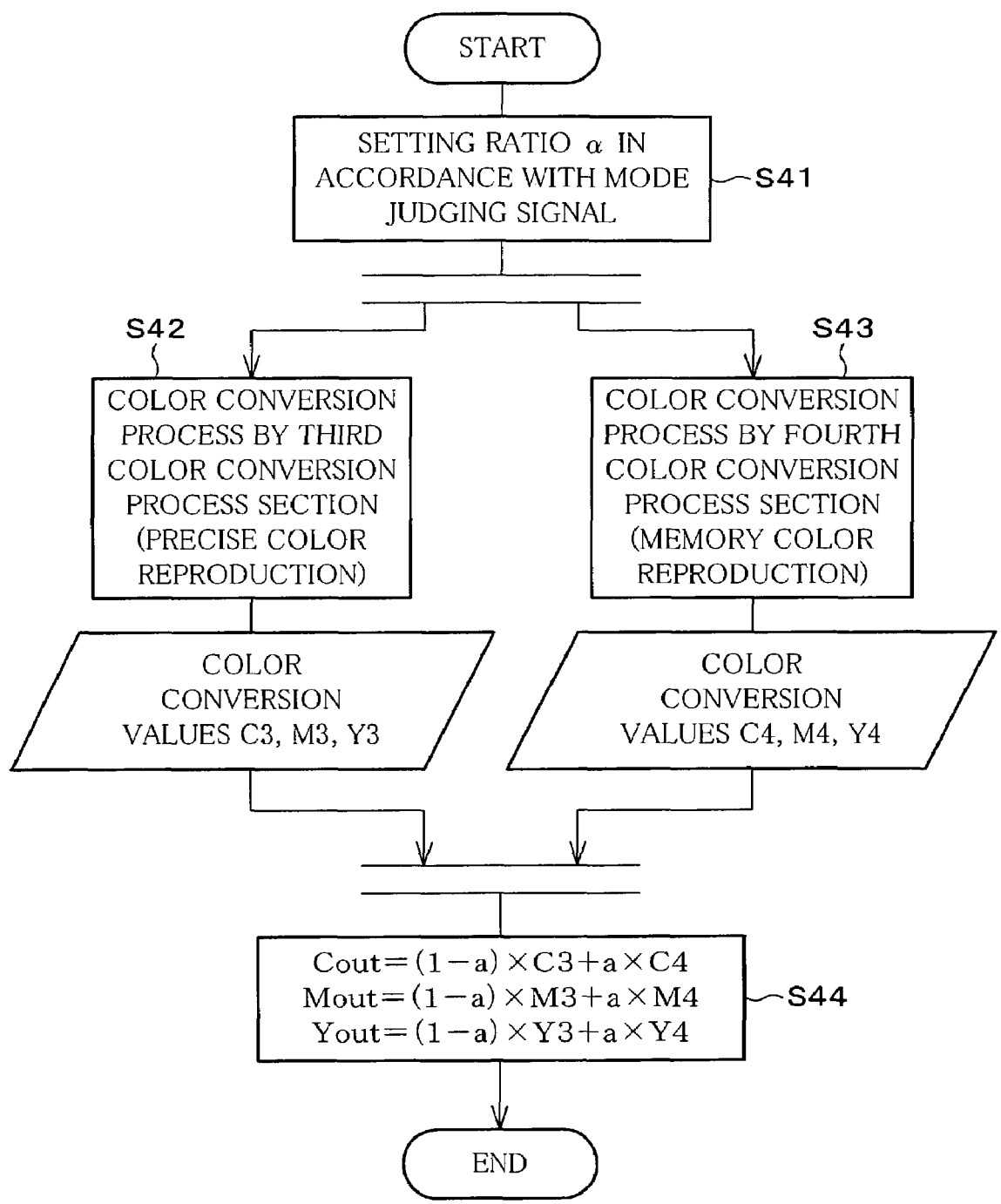
FIG. 10 is a flowchart, describing a color conversion process using the color conversion section of FIG. 9.

An example of the color conversion processes of the color conversion section 10d with the foregoing arrangement are described in reference to a flowchart in FIG. 10. In S41, the signal processing section 42 judges whether the mode in effect is a copy mode or a printer mode, according to a mode judging signal, and the ratio α is set in accordance with Table. 1. Then as parallel processing, the third color conversion process section 35 carries out a third conversion process in S42, and in S43, the fourth color conversion process section 41 carries out a fourth color conversion process. Next, in S44, the signal processing section 42 adds the sets of the image data C3, M3, and Y3 to the sets of the image data C4, M4, and Y4 at the ratio α, using an equation illustrated in S44, so that the sets of the image data Cout, Mout, and Yout as the second color image data are outputted.

Further, in the copy mode, it is possible to set the ratio α in accordance with each type of the document identified by the image type judging signals, and examples of the setting are illustrated in Table. 2.

TABLE 2

| | RATIO α | | |
|---|---|---|---|
| DOCUMENT TYPE JUDGING SIGNAL | PHOTO DOCUMENT T3 | TEXT/PHOTO DOCUMENT T2 | TEXT DOCUMENT T1 |
| | 0 < T1 < T2 < T3 < 1 | | |
| IMAGE MODE SIGNAL | CONTINUOUS TONE IMAGE PHOTO T3 | PRINTED PHOTO T2 | TEXT T1 |
| | 0 < T1 < T2 < T3 < 1 | | |
| AREA IDENTIFICATION SIGNAL | AREAS OTHER THAN TEXT AREA T2 | | TEXT AREA T1 |
| | 0 < T1 < T2 < 1 | | |

Here, Table. 2 indicates that when the document type judging signal or the area identification signal is used, the ratio α can be set in accordance with the degree of recognition by the signals. The degree of recognition is to recognize the ratio of the text area to the photo area in the case of the document type judging signal, and to recognize the ratio of the text area to areas other than the text area in the case of the area identification signal.

Corresponding to each type of the document, the setting of the ratio α by the document type judging signals is arranged as below. On the occasion of a photo document, flesh color and sky blue are likely to be included so that, for instance, α (T3 in Table. 2) is set so as to be 0.8, in order to reproduce preferable colors. On the occasion of a text document, flesh color and sky blue are unlikely to be included so that, for instance, α (T1 in Table. 2) is set so as to be 0.1, in order to reproduce precise colors. On the occasion of a text/photo document, α (T2 in Table. 2) is, for instance, set so as to be 0.5, in order to reproduce colors of both photos and texts.

Moreover, the setting of the ratio α by the image mode signal is, for instance, carried out as below. On the occasion of a text mode, flesh color and sky blue are unlikely to be included (or the user clearly instructs to reproduce lines such as texts so that colors such as flesh color are not necessarily reproduced with preferable colors) so that, for instance, α (T1 in Table. 2) is set so as to be 0.1, in order to reproduce precise colors. On the occasions of a continuous tone image mode and a print photo mode, flesh color and sky blue are likely to be included so that color reproduction with preferable colors is carried out. In particular, most of the continuous tone images are portraits or scenic photos so that it is desirable that color reproduction most suitable for the continuous tone image mode (i.e. memory color reproduction) is carried out, and hence, for instance, α (T3 in Table.

2) is 0.9 in the continuous tone image mode, and α (T2 in Table. 2) is 0.7 in the print photo mode.

Moreover, when the ratio α is set using an area separation signal, precise color reproduction is carried out in the text area, and in order to carry out color reproduction with both memory colors and precise colors in areas other than the text area, for instance, α (T1 in Table. 2) is set so as to be 0.1 in the text area, and α (T2 in Table. 2) is set so as to be 0.5 in the areas other than the text area.

Further, the foregoing adjusting signal is generated by the user using an image forming apparatus 1 or 21 (for instance, by pushing buttons on a control panel 5) or a computer system (for instance, using a keyboard, a mouse, and a display screen). Using this adjusting signal, it is possible to figure out the color conversion value by arbitrarily setting the ratio α so as to add the sets of the image data C3, M3, and Y3 to the sets of the image data C4, M4, and Y4.

Figure 11:
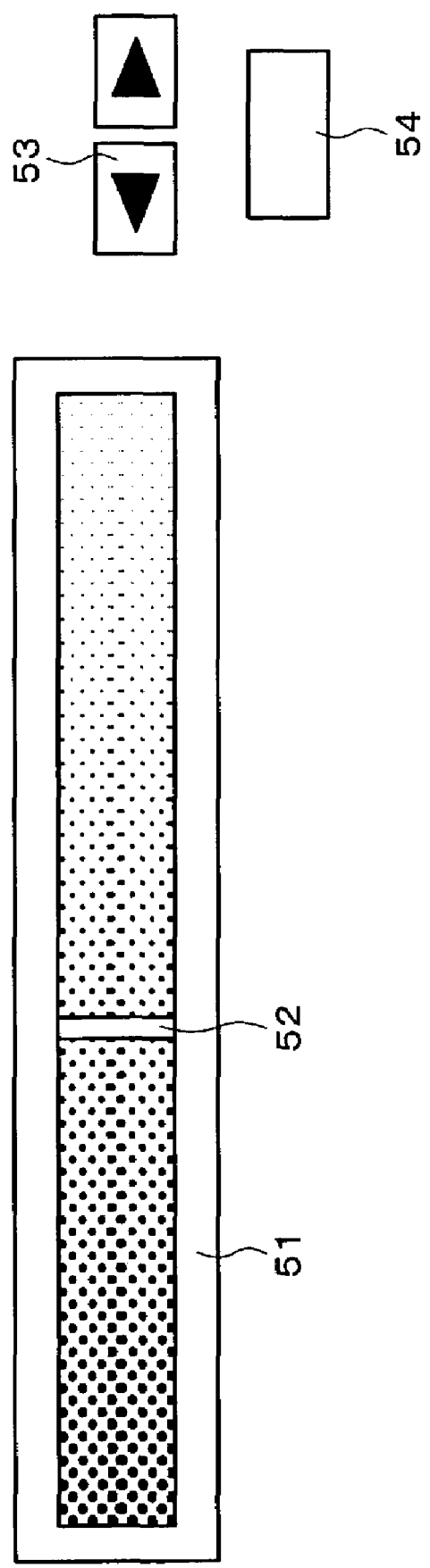
FIG. 11 is a plan view, illustrating an arrangement of a control panel for setting a ratio in the color conversion section of FIG. 9.

When adjusting the ratio α using the adjusting signal, for instance, the control panel 5 displays a description such as "more beautiful flesh color and landscape", the control panel 5 is provided with an instruction screen 51 as illustrated in FIG. 11, and a ratio setting scale 52 displayed on the instruction screen 51 is manipulated via setting buttons 53, then the setting is finalized by pushing a confirmation button 54. In this case, even though not all types of images are supported, it is possible to arbitrarily set the ratio α since sample colors as gradation sequence, etc. are displayed on the instruction screen 51 for helping the setting of the ratio α.

Figure 12:
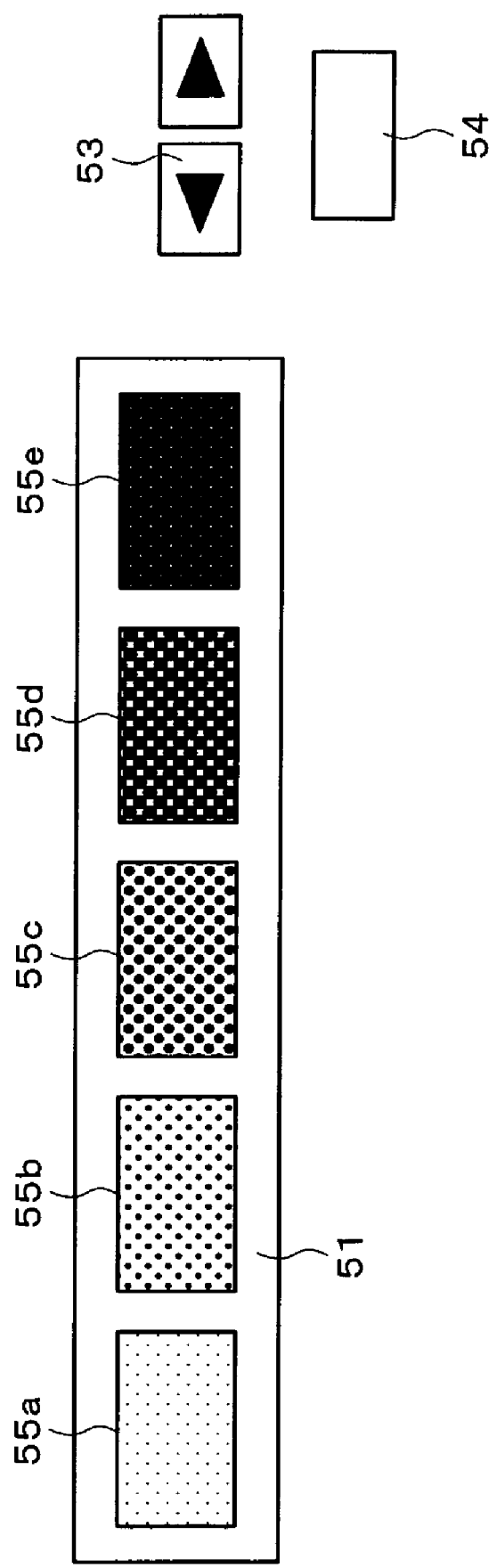
FIG. 12 is a plan view, illustrating another arrangement of the control panel for setting a ratio in the color conversion section of FIG. 9.

Moreover, it is possible to set the ratio α in accordance with color levels as in FIG. 12, instead of setting the same in a continuous manner as in FIG. 11. According to FIG. 12, the instruction screen 51 displays color levels to be chosen, such as color levels 55*a*–55*e*.

Although the foregoing ratio α indicates the ratio of color transition on a line from a point $P_1$ to a point $P_2$ which are described in First Example, it is possible to set the ratio of color transition in a whole color transition area which is also described in First Example, so that it is possible to select a color transition area which has a suitable shape. For instance, a color transition area with a shape of ellipsoid is used for realizing high-resolution color reproduction, a color transition area with a shape of sphere is used for realizing normal color reproduction, and a color transition area with a shape of straight line is used for realizing simple color reproduction.

Alternatively, an image after being subjected to a color conversion process may be displayed on a display section of the control panel 5 for the reference with which the user decides whether the ratio α (ratio of color transition) is changed or not. On this occasion, it is preferable that the display section can display the whole image.

In the present embodiment, a value indicating the ratio of color transition specified by the user in a color transition area, such as the ratio α, is a parameter for changing the ratio of color transition. Using this parameter, when a transitional color conversion value is set as reproduced image data with respect to data which is judged as memory color corresponding data among read image data, it is possible to figure out the ratio of color transition from a precise color conversion value and from a memory color conversion value. With this arrangement, it is possible to change a transitional color conversion value in accordance with different situations. Moreover, in First to Fourth examples, when selecting an LUT from a plurality of LUTs which are generated in advance such as a first LUT and a first' LUT having each different ratio of color transition, a selection criterion generated in a control panel 5 and a selection criterion generated in a color conversion section 10 are also recognized as the foregoing parameter.

Further, according to the present embodiment, the parameter for changing a transitional color conversion value is not only used for the data judged as memory color corresponding data of read image data but also used for, as illustrated in Tables. 1 and 2, the data judged as memory color corresponding data of recognizable memory color reproduction designating data, in order to obtain a memory color conversion value as second color image data. Thus, it is possible to apply the same processing to both an image to be reproduced using transitional colors and an image to be reproduced memory colors, so that a color conversion process is simplified.

Moreover, according to the present embodiment, since it is possible to change the parameter in accordance with each type of images included in a document, it is possible to change the ratio of color transition in accordance with each type of images.

Moreover, according to the present embodiment, since the parameter can be arbitrarily set, it is possible to arbitrarily set the ratio of color transition so that a desired transitional color conversion value can be obtained. Up to this point we have considered the examples of the present embodiment. Now, since an image forming apparatus 1 or 21 includes a color image processing apparatus 3 including the aforementioned color conversion section 10, image forming can be carried out in accordance with the result of image processing in the color image processing apparatus 3. Further, the color image processing apparatus 3 and the image processing method described above makes it possible to carry out a color conversion process with which a reproduced image appears natural, and hence the user will be satisfied with the outcome.

In the present embodiment, it has been pointed out that when a color image inputting apparatus 2 is a scanner, a suitable image quality on the occasion of simultaneously looking at a document and a reproduced image is different from a suitable image quality on the occasion of only looking at the reproduced image. This idea can be appropriated for a camera system (such as a digital camera with a printer and an instant camera).

In this case, a document corresponds to an original image to be seen (original scenery in the case of photos), and a reproduced image corresponds to an output image. While photo developing is generally carried out with the most preferable color reproduction, since a system by which outputting can be immediately carried out makes it possible to simultaneously look at the original image and the output image, the image cannot be reproduced properly when only preferable color reproduction (memory color reproduction) is carried out. In contrast, when only precise color reproduction is carried out, the outputted image lacks preferability, when the image is seen later. For this reason, with transitional color reproduction as in the present embodiment, it is possible to correspond to both of the foregoing cases.

Moreover, in the present embodiment, the image processing method including the foregoing color conversion process can be realized as a computer program. Thus, since the image processing method can be carried out using a computer, versatility is imparted to the image processing method. Further, it is possible to arrange the program so as to be stored in a computer-readable storage medium. With this arrangement, it is possible to easily provide the program to computers.

In the present embodiment, it is noted that the storage medium may be a memory (not illustrated) such as a ROM for the processing by a microcomputer, or may be a storage medium (not illustrated) read by a program reading apparatus as an external storage apparatus (not illustrated).

At all events, the stored program may be executed by accessing a microprocessor, or may be executed by a method such that the program is read so as to be downloaded to a program storing area (not illustrated) of a microcomputer, and consequently executed. Here, a program for downloading is stored in a main apparatus in advance.

In this case, the foregoing storage medium may be a storage medium including semiconductor memories, which is attachable/detachable from/to the main apparatus and holds the program in a fixed manner, such as tapes (a magnetic tape and a cassette tape), disks (magnetic disks such as a floppy disk® and a hard disk and optical disks such as a CD-ROM disk, an MO disk, an MD disk, a DVD disk), cards (an optical card), a mask ROM, an EPROM (Erasable Programmable Read Only Memory), an EEPROM (Electrically Erasable Programmable Read Only Memory), and a flash ROM.

Moreover, since the present embodiment is arranged so as to be connectable to communication networks including the Internet, the program may be fluidly carried by a medium, so as to be downloaded therefrom. A program for the downloading may be stored in the main apparatus in advance or may be installed from another storage medium.

The storage medium is read by a digital color image forming apparatus and a program reading apparatus in the computer system, so that the foregoing image processing method is carried out.

The computer system is composed of: an image input apparatus such as a flat-bed scanner, a film scanner, and a digital camera; a computer which carries out various types of processing such as the foregoing image processing method, by downloading a predetermined program; an image display apparatus such as a CRT display and a liquid crystal display, for displaying the result of processing in the computer; and a printer for outputting the result of processing in the computer etc. on a piece of paper. The computer system further includes a modem as communication means for being connected to a server, etc. via a network.

Moreover, to solve the foregoing problems, the image processing method in accordance with the present invention is characterized in that the color conversion process can be carried out in such a manner that, when the first color image data includes the memory color corresponding data including data judged as memory color reproduction designating data in which it is predetermined that the memory color conversion value is obtained, the second color image data is obtained using the memory color conversion value, with respect to the memory color reproduction designating data, while the second color image data is obtained using the precise color conversion value, with respect to the memory color corresponding data other than the memory color reproduction designating data.

According to this invention, when the memory color reproduction designating data is identified, it is possible to obtain the memory color conversion value as the second color image data with respect to the data identified as the memory color reproduction designating data, and with respect to the memory color reproduction data other than the memory color corresponding data, it is possible to obtain precise color conversion value as the second color image data. Thus, with respect to the first color image data in, for instance, a printer mode of a multifunctional machine for printing data inputted from the outside, a facsimile transmission mode in which a transmitting end carries out a color conversion process and the document is not copied, and a facsimile reception mode in which a receiving end carries out a color conversion process, the memory color corresponding data can be converted to memory colors which are preferable, since the data is identified as the memory color reproduction designating data due to the modes in which the formed image is not compared with the original image and the formed image cannot be compared with the original image.

Moreover, to solve the foregoing problems, the image processing method in accordance with the present invention is characterized in that the color conversion process can be carried out in such a manner that, when the first color image data is conversion value fix data in which it is predetermined that a color conversion value fixed at the precise color conversion value is obtained as the second color image data, the second color image data is obtained using the color conversion value fixed at the precise color conversion value, with respect to all of the conversion value fix data.

According to this invention, when the conversion value fix data is identified, with respect to all of the conversion value fix data, the color conversion value fixed at the precise color conversion value is obtained as the second color image data, so that it is possible to compellingly carry out only reproduction with precise colors.

Moreover, to solve the foregoing problems, the image processing method in accordance with the present invention is characterized in that the color conversion process can be carried out in such a manner that, when (i) the original image is a photo-including document which is a document including at least a photo and (ii) the read image data of the photo-including document includes data judged as the memory color corresponding data, the reproduced image data is obtained using the transitional color conversion value, with respect to the memory color corresponding data of the photo-including document, while, when the original image is a text/line document which is a document composed of at least one of a text and a drawing line, even if the read image data of the text/line document includes data judged as the memory color corresponding data, the reproduced image data is obtained using the precise color conversion value, with respect to the memory color corresponding data of the text/line document.

According to this invention, when the original image is the photo-including document, data judged as the memory color corresponding data is converted to the transitional color conversion value so that the reproduced image data is obtained. Thus, it is possible to carry out a color conversion process which is substantially suitable for the fact that the memory color corresponding data of the photo-including document is desirably reproduced with memory colors and the memory color corresponding data of the text/line document is desirably reproduced with precise colors.

Moreover, to solve the foregoing problems, the image processing method in accordance with the present invention is characterized in that, in the color conversion process, the transitional color conversion value is obtained using a look up table method.

According to this invention, the memory color corresponding data is converted to the transitional color conversion value using the look up table method, and hence it is possible to carry out the color conversion process easily.

Moreover, to solve the foregoing problems, the image processing method in accordance with the present invention is characterized in that the color conversion process can be carried out in such a manner that, when the read image data includes data judged as the memory color corresponding data, in order to obtain the reproduced image data with respect to the memory color corresponding data, the transitional color conversion value is figured out according to a parameter for changing a ratio of color conversion in accordance with the precise color conversion value and the memory color conversion value in the color transition area.

According to this invention, when the transitional color conversion value is converted to the reproduced image data with respect to data identified as the memory color corresponding data of the read image data, it is possible to change the parameter so as to figure out the ratio of the color transition from the precise color conversion value and the memory color conversion value. This enables to change the transitional color conversion value in accordance with different situations.

Moreover, to solve the foregoing problems, the image processing method in accordance with the present invention is characterized in that the color conversion process can be carried out in such a manner that, when the first color image data includes the memory color corresponding data including data judged as memory color reproduction designating data in which it is predetermined that the memory color conversion value is obtained as the second color image data, the second color image data is obtained using the memory color conversion value, with respect to the memory color reproduction designating data of the memory color corresponding data, and the parameter is set for the memory color reproduction designating data of the memory color corresponding data, in order to obtain the second color image data.

According to this invention, the parameter for changing the transitional color conversion value can be used not only for the data judged as the memory color corresponding data of the read image data but also for the data judged as the memory color corresponding data of the memory color reproduction designating data which can be identified, in order to obtain the memory color conversion value as the second color image data. Thus, with respect to both an image which should be reproduced with transitional colors and an image which should be reproduced with memory colors, identical processing can be applied, and this enables to simplify the color conversion process.

Moreover, to solve the foregoing problems, the image processing method in accordance with the present invention is characterized in that, when the original image is a document, the parameter corresponds to each predetermined type of images included in the document.

According to this invention, since the parameter can be changed in accordance with the type of images in the document, the ratio of color transition can be changed in accordance with the type of images.

Moreover, to solve the foregoing problems, the image processing method in accordance with the present invention is characterized in that it is possible to arbitrarily set the parameter.

According to this invention, since it is possible to arbitrarily set the ratio of color transition, a desired transitional color conversion value can be obtained.

Moreover, a program of the present invention is characterized by causing a computer to carry out any one of the foregoing image processing methods.

According to this invention, any one of the foregoing image processing methods can be executed by a computer so that versatility is imparted to the image processing methods.

Moreover, a storage medium of the present invention is characterized by storing the program in a computer-readable manner.

This invention enables to provide the program for a computer without difficulty.

Moreover, to solve the foregoing problems, the image processing apparatus in accordance with the present invention, comprising color conversion process means for carrying out a color conversion process in which first color image data composed of a first color system is converted to second color image data composed of a second color system, and when the first color image data is read image data which is obtained by reading a visible object as an original image, the second color image data is set so as to be reproduced image data for forming a reproduced image of the original image, is characterized in that, the color conversion process is carried out in such a manner that, when the read image data includes data which is judged as memory color corresponding data, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data, while the reproduced image data is obtained using the precise color conversion value, with respect to the read image data other than the memory color corresponding data.

According to this invention, when the first color image data is the read image data and data judged as the memory color corresponding data is included, instead of fixing the memory color corresponding data at either the precise color conversion value or the memory color conversion value, the memory color corresponding data is converted to the transitional color conversion value in the color transition area which is color-converted from the precise color conversion value and the memory color conversion value, so as to be the reproduced image data, i.e. the second color image data. Moreover, the read image data other than the memory color corresponding data is converted to the precise color conversion value so as to be the reproduction data, i.e. the second color image data. Since the color transition area is an area in which the precise color conversion value and the memory color conversion value are color-transited to predetermined points, in the color transition area, it is possible to obtain the transitional color conversion value whose reproduced image colors with respect to the memory color corresponding data appears both precise colors and memory colors. With this arrangement, the reproduced image looks natural with or without the comparison with the original image.

As a result, it is possible to carry out a color conversion process in such a manner that a reproduced image (i) which is read from a visible object to which a memory color can be allocated, as an original image, and (ii) which is obtained through the color conversion process, appears natural with or without the comparison with the original image.

Moreover, to solve the foregoing problems, the image processing apparatus in accordance with the present invention is characterized in that the color conversion process can be carried out in such a manner that, when the first color image data includes the memory color corresponding data including data judged as memory color reproduction designating data in which it is predetermined that the memory color conversion value is obtained, the second color image data is obtained using the memory color conversion value, with respect to the memory color reproduction designating data, while the second color image data is obtained using the precise color conversion value, with respect to the memory color corresponding data other than the memory color reproduction designating data.

According to this invention, when the memory color reproduction designating data is identified, it is possible to obtain the memory color conversion value as the second color image data with respect to the data identified as the memory color reproduction designating data, and with respect to the memory color reproduction data other than the memory color corresponding data, it is possible to obtain a precise color conversion value as the second color image data. Thus, with respect to the first color image data in, for instance, a printer mode of a multifunctional machine for printing data inputted from the outside, a facsimile transmission mode in which a transmitting end carries out a color conversion process and the document is not copied, and a facsimile reception mode in which a receiving end carries out a color conversion process, the memory color corresponding data can be converted to memory colors which are preferable, since the data is identified as the memory color reproduction designating data due to the modes in which the formed image is not compared with the original image and the formed image cannot be compared with the original image.

Moreover, to solve the foregoing problems, the image processing apparatus in accordance with the present invention is characterized in that when the first color image data is conversion value fix data in which it is predetermined that a color conversion value fixed at the precise color conversion value is obtained as the second color image data, the second color image data is obtained using the color conversion value fixed at the precise color conversion value, with respect to all of the conversion value fix data.

According to this invention, when the conversion value fix data is identified, with respect to all of the conversion value fix data, the color conversion value fixed at the precise color conversion value is obtained as the second color image data, so that it is possible to compellingly carry out only reproduction with precise colors.

Moreover, to solve the foregoing problems, the image processing apparatus in accordance with the present invention is characterized in that when (i) the original image is a photo-including document which is a document including at least a photo and (ii) the read image data of the photo-including document includes data judged as the memory color corresponding data, the reproduced image data is obtained using the transitional color conversion value, with respect to the memory color corresponding data of the photo-including document, while, when the original image is a text/line document which is a document composed of at least one of a text and a drawing line, even if the read image data of the text/line document includes data judged as the memory color corresponding data, the reproduced image data is obtained using the precise color conversion value, with respect to the memory color corresponding data of the text/line document.

According to this invention, when the original image is the photo-including document, data judged as the memory color corresponding data is converted to the transitional color conversion value so that the reproduced image data is obtained. Thus, it is possible to carry out a color conversion process which is substantially suitable for the fact that the memory color corresponding data of the photo-including document is desirably reproduced with memory colors and the memory color corresponding data of the text/line document is desirably reproduced with precise colors.

Moreover, to solve the foregoing problems, the image processing apparatus in accordance with the present invention is characterized in that the color conversion process means is arranged so that, in the color conversion process, the transitional color conversion value is obtained using a look up table method.

According to this invention, the memory color corresponding data is converted to the transitional color conversion value using the look up table method, and hence it is possible to carry out the color conversion process easily.

Moreover, to solve the foregoing problems, the image processing apparatus in accordance with the present invention is characterized in that the color conversion process means carries out the color conversion process in such a manner that, when the read image data includes data judged as the memory color corresponding data, in order to obtain the reproduced image data with respect to the memory color corresponding data, the transitional color conversion value is figured out according to a parameter for changing a ratio of color conversion in accordance with the precise color conversion value and the memory color conversion value in the color transition area.

According to this invention, when the transitional color conversion value is converted to the reproduced image data with respect to data identified as the memory color corresponding data of the read image data, it is possible to change the parameter so as to figure out the ratio of the color transition from the precise color conversion value and the memory color conversion value. This enables to change the transitional color conversion value in accordance with different situations.

Moreover, to solve the foregoing problems, the image processing apparatus in accordance with the present invention is characterized in that the color conversion process means carries out the color conversion process in such a manner that, when the first color image data includes the memory color corresponding data including data judged as memory color reproduction designating data in which it is predetermined that the memory color conversion value is obtained as the second color image data, the second color image data is obtained using the memory color conversion value, with respect to the memory color reproduction designating data of the memory color corresponding data, and the parameter is set for the memory color reproduction designating data of the memory color corresponding data, in order to obtain the second color image data.

According to this invention, the parameter for changing the transitional color conversion value can be used not only for the data judged as the memory color corresponding data of the read image data but also for the data judged as the memory color corresponding data of the memory color reproduction designating data which can be identified, in order to obtain the memory color conversion value as the second color image data. Thus, with respect to both an image which should be reproduced with transitional colors and an image which should be reproduced with memory colors, identical processing can be applied, and this enables to simplify the color conversion process.

Moreover, to solve the foregoing problems, the image processing apparatus in accordance with the present invention is characterized in that, when the original image is a document, the parameter corresponds to each predetermined type of images included in the document.

According to this invention, since the parameter can be changed in accordance with the type of images in the document, the ratio of color transition can be changed in accordance with the type of images.

Moreover, to solve the foregoing problems, the image processing apparatus in accordance with the present invention is characterized in that it is possible to arbitrarily set the parameter.

According to this invention, since it is possible to arbitrarily set the ratio of color transition, a desired transitional color conversion value can be obtained.

Moreover, the image forming apparatus in accordance with the present invention is characterized by comprising any one of the foregoing image processing apparatuses.

According to this invention, it is possible to carry out image forming in accordance with the result of image processing by any one of the foregoing image processing apparatuses.

To solve the foregoing problems, the image processing method in accordance with the present invention, comprising a step of carrying out a color conversion process in which first color image data composed of a first color system is converted to second color image data composed of a second color system, and when the first color image data is read image data which is obtained by reading a visible object as an original image, the second color image data is set so as to be reproduced image data for forming a reproduced image of the original image, is characterized in that, the color conversion process is carried out in such a manner that, when the read image data includes data which is judged as memory color corresponding data, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data.

According to this invention, when the first color image data is the read image data and data judged as the memory color corresponding data is included, instead of fixing the memory color corresponding data at either the precise color conversion value or the memory color conversion value, the memory color corresponding data is converted to the transitional color conversion value in the color transition area which is color-converted from the precise color conversion value and the memory color conversion value, so as to be the reproduced image data, i.e. the second color image data. Since the color transition area is an area in which the precise color conversion value and the memory color conversion value are color-transited to predetermined points, in the color transition area, it is possible to obtain the transitional color conversion value whose reproduced image colors with respect to the memory color corresponding data appears both precise colors and memory colors. With this arrangement, the reproduced image looks natural with or without the comparison with the original image.

As a result, it is possible to carry out a color conversion process in such a manner that a reproduced image (i) which is read from a visible object to which a memory color can be allocated, as an original image, and (ii) which is obtained through the color conversion process, appears natural with or without the comparison with the original image.

Moreover, to solve the foregoing problems, the image processing device in accordance with the present invention, comprising color conversion process means for carrying out a color conversion process in which first color image data composed of a first color system is converted to second color image data composed of a second color system, and when the first color image data is read image data which is obtained by reading a visible object as an original image, the second color image data is set so as to be reproduced image data for forming a reproduced image of the original image, is characterized in that, the color conversion process is carried out in such a manner that, when the read image data includes data which is judged as memory color corresponding data, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data.

According to this invention, when the first color image data is the read image data and data judged as the memory color corresponding data is included, instead of fixing the memory color corresponding data at either the precise color conversion value or the memory color conversion value, the memory color corresponding data is converted to the transitional color conversion value in the color transition area which is color-converted from the precise color conversion value and the memory color conversion value, so as to be the reproduced image data, i.e. the second color image data. Since the color transition area is an area in which the precise color conversion value and the memory color conversion value are color-transited to predetermined points, in the color transition area, it is possible to obtain the transitional color conversion value whose reproduced image colors with respect to the memory color corresponding data appears both precise colors and memory colors. With this arrangement, the reproduced image looks natural with or without the comparison with the original image.

As a result, it is possible to carry out a color conversion process in such a manner that a reproduced image (i) which is read from a visible object to which a memory color can be allocated, as an original image, and (ii) which is obtained through the color conversion process, appears natural with or without the comparison with the original image.

The judgment whether or not the read image data includes data judged as the memory color corresponding data is preferably made by a mode judging section for differentiating between a copy mode and a printer mode.

With this arrangement, when the copy mode is identified, the data judged as the memory color corresponding data can be recognized in the read image data so that it is possible to convert the memory color corresponding data to the transitional color conversion value so as to set the same as the reproduced image data.

Moreover, when the copy mode is identified as a result of the foregoing judgment, it is preferable that the mode judging section judges whether the document is the photo-including document or the text/line document.

With this arrangement, only when the photo-including document is identified, the memory color corresponding data is converted to the transitional color conversion value so as to set the same as the reproduced image data.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing method, comprising a step of carrying out a color conversion process in which first color image data composed of a first color system is converted to second color image data composed of a second color system, and when the first color image data is read image data which is obtained by reading a visible abject as an original image, the second color image data is set so as to be reproduced image data for fanning a reproduced image of the original image, wherein, the color conversion process is carried out in such a manner that, when the read image data includes data which is judged as memory color corresponding data, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data, while the reproduced image data is obtained using the precise color conversion value, with respect to the read image data other than the memory color corresponding data.

2. The image processing method as defined in claim 1, wherein, the color conversion process can be carried out in such a manner that, when the first color image data includes the memory color corresponding data including data judged as memory color reproduction designating data in which it is predetermined that the memory color conversion value is obtained, the second color image data is obtained using the memory color conversion value, with respect to the memory color reproduction designating data, while the second color image data is obtained using the precise color conversion value, with respect to the memory color corresponding data other than the memory color reproduction designating data.

3. The image processing method as defined in claim 1, wherein, the color Conversion process can be carried out in such a manner that, when the first color image data is conversion value fix data in which it is predetermined that a color conversion value fixed at the precise color conversion value is obtained as the second color image data, the second color image data is obtained using the color conversion value fixed at the precise color conversion value, with respect to all of the conversion value fix data.

4. The image processing method as defined in claim 1, wherein, the color conversion process can be carried out in such a manner that, when (i) the original image is a photo-including document which is a document including at least a photo and (ii) the read image data of the photo-including document includes data judged as the memory color corresponding data, the reproduced image data is obtained using the transitional color conversion value, with respect to the memory color corresponding data of the photo-including document, while, when the original image is a text/line document which is a document composed of at least one of a text and a drawing line, even if the read image data of the text/line document includes data judged as the memory color corresponding data, the reproduced image data is obtained using the precise color conversion value, with respect to the memory color corresponding data of the text/line document.

5. The image processing method as defined in claim 1, wherein, in the color conversion process, the transitional color conversion value is obtained using a look up table method.

6. The image processing method as defined in claim 1, wherein, the color conversion process can be carried out in such a manner that, when the read image data includes data judged as the memory color corresponding data, in order to obtain the reproduced image data with respecto to the memory color corresponding data, the transitional color conversion value is figured out according to a parameter for changing a ratio of color conversion in accordance with the precise color conversion value and the memory color conversion value in the color transition area.

7. The image processing method as defined in claim 6, wherein, the color conversion process can be carried out in such a manner that, when the first color image data includes the memory color corresponding data including data judged as memory color reproduction designating data in which it is predetermined that the memory color conversion value is obtained as the second color image data, the second color image data is obtained using the memory color conversion value, with respect to the memory color reproduction designating data of the memory color corresponding data, and the parameter is set for the memory color reproduction designating data of the memory color corresponding data, in order to obtain the second color image data.

8. The image processing method as defined in claim 6, wherein, when the original image is a document, the parameter corresponds to each predetermined type of images included in the document.

9. The image processing method as defined in claim 6, wherein, it is possible to arbitrarily set the parameter.

10. A tangible storage medium, which fluidly stores a program in a computer-readable manner for downloading therefrom to a computer to carry out an image processing method, which program includes instructions, criteria and code segments to perform color conversion process and to control the operating of an image processing apparatus, said instructions, criteria and code segments including;

converting first color image data composed of a first color system to second color image data composed of a second color system;

setting the second color image data so as to be reproduced image data for forming a reproduce image of the original image, when the first color image data is read image data which is obtained by reading a visible object as an original image; and wherein, when the read image data includes data which is judged as memory color corresponding data, in order to obtain a reproduced image having colors substantially identical with colors of the original image, the reproduction image data is obtained using a transitional color conversion value which is a color conversion value hi a color transition area formed in accordance with (i) a precise color conversion value for converting the read image data to the reproduced image data and (ii) a memory color conversion value for subjecting the read image data to a memory color conversion process, with respect to the memory color corresponding data, while the reproduced image data is obtained using the precise color conversion value, with respect to the read image data other than the memory color corresponding data.

11. A storage medium, which stores a program in a computer-readable manner, for subjecting a computer to carry out an image processing method, the image processing method comprising a step of carrying out a color conversion process in which first color image data composed of a first color system is converted to second color image data composed of a second color system, and when the first color image data is read image data which is obtained by reading a visible object as an original image, the second color image data is set so as to be reproduced image data for forming a reproduced image of the original image, wherein, the color conversion process is carried out in such a manner that, when the read image data includes data which is judged as memory color corresponding data, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data, while the reproduced image data is obtained using the precise color conversion value, with respect to the read image data other than the memory color corresponding data.

12. An image processing apparatus, comprising color conversion process means for carrying out a color conversion process in which first color image data composed of a first color system is converted to second color image data composed of a second color system, and when to first color image data is rend image data which is obtained by reading a visible object as an original image, the second color image data is set so as to be reproduced image data for forming a reproduced image of the original image, wherein, the color conversion process is carried out in such a manner that, when the read image data includes data which is judged as memory color corresponding data, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data, while the reproduced image data is obtained using the precise color conversion value, with respect to the read image data other than the memory color corresponding data.

13. The image processing apparatus as defined in claim 12, wherein, the color conversion process means is capable of carrying out the color conversion process in such a manner that when the first color image data includes the memory color corresponding data including data judged as memory color reproduction designating data in which it is predetermined that the memory color conversion value is obtained, the second color image data is obtained using the memory color conversion value, with respect to the memory color reproduction designating data, while the second color image data is obtained using the precise color conversion value, with respect to the memory color corresponding data other than the memory color reproduction designating data.

14. The image processing apparatus as defined in claim 12, wherein, the color conversion process means is capable of carrying out the color conversion process in such a manner that, when the first color image data is conversion value fix data in which it is predetermined that a color conversion value fixed at the precise color conversion value is obtained as the second color image data, the second color image data is obtained using the color conversion value fixed at the precise color conversion value, with respect to all of the conversion value fix data.

15. The image processing apparatus as defined in claim 12, wherein, the color conversion process means is capable of carrying out the color conversion process in such a manner that, when (i) the original image is a photo-including document which is a document including at lease a photo and (ii) the read image data of the photo-including document includes data judged as the memory color corresponding data, the reproduced image data is obtained using the transitional color conversion value, with respect to the memory color corresponding data of the photo-including document, while, when the original image is a text/line document which is a document composed of at least one of a text and a drawing line, even if the read image data of the text/line document includes data judged as the memory color corresponding data, the reproduced image data is obtained using the precise color conversion value, with respect to the memory color corresponding data of the text/line document.

16. The image processing apparatus as defined in claim 12, wherein, the color conversion process means is arranged so that, in the color conversion process, the transitional color conversion value is obtained using a look up table method.

17. The image processing apparatus as defined in claim 12, wherein, the color conversion process means carries out the color conversion process in such a manner that, when the read image data includes data judged as the memory color corresponding data, in order to obtain the reproduced image data wit respect to the memory color corresponding data, the transitional color conversion value is figured out according to a parameter for changing a ratio of color conversion in accordance with the precise color conversion value and the memory color conversion value in the color transition area.

18. The image processing apparatus as defined in claim 17, wherein, the color conversion process can be carried out in such a manner that, when the first color image data includes the memory color corresponding data including data judged as memory color reproduction designating data in which it is predetermined that the memory color conversion value is obtained as the second color image data, the second color image data is obtained using the memory color conversion value, with respect to the memory color reproduction designating data of the memory color corresponding data, and the parameter is set for the memory color reproduction designating data of the memory color corresponding data, in order to obtain the second color image data.

19. The image processing apparatus as defined in claim 17, wherein, when the original image is a document, the parameter corresponds to each predetermined type of images included in the document.

20. The image processing apparatus as defined in claim 17, wherein, it is possible to arbitrarily set the parameter.

21. An image forming apparatus, comprising an image processing apparatus including color conversion process means for carrying out a color conversion process in which first color image data composed of a first color system is converted to second color image data composed of a second color system, and when the first color image data is read image data which is obtained by reading a visible object as an original image, the second color image data is set so as to be reproduced image data for forming a reproduced image of the original image, wherein, the color conversion process is carried out in such a manner that, when the read image data includes data which is judged as memory color corresponding data, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data, while the reproduced image data is obtained using the precise color conversion value, with respect to the read image data other than the memory color corresponding data.

22. An image processing method, comprising a step of carrying out a color conversion process in which first color image data composed of a first color system is converted to second color image data composed of a second color system, and when the first color image data is read image data which is obtained by reading a visible object as an original image, the second color image data is set so as to be reproduced image data for forming a reproduced image of the original image, wherein, the color conversion process is carried out in such a manner that, when the read image data includes data which is judged as memory color corresponding dais, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data.

23. An image processing apparatus, comprising color conversion process means for carrying out a color conversion process in which first color image data composed of a first color system is converted to second color image data composed of a second color system, and when the first color image data is read image data which is obtained by reading a visible object as an original image, the second color image data is set so as to be reproduced image data for forming a reproduced image of the original image, wherein, the color conversion process is carried out in such a manner that, when the read image data includes data which is judged as memory color corresponding data, in order to obtain a reproduced image having colors substantially identical with colors of the original image, the reproduction image data is obtained using a transitional color conversion value which is a color conversion value in a color transition area formed in accordance with (i) a precise color conversion value for converting the read image data to the reproduced image data and (ii) a memory color conversion value for subjecting the read image data to a memory color conversion process, with respect to the memory color corresponding data.

24. The image processing apparatus as defined in claim 23, wherein, whether or not the read image data includes data judged as the memory color corresponding data is judged by a mode judging section for differentiating between a copy mode and a printer mode.

25. The image processing apparatus as defined in claim 24, wherein, when it is found that the copy mode is in effect according to a result of judgment, the mode judging section judges a type of the document, whether a photo-including document or a text/line document.

* * * * *